US012664906B2

(12) United States Patent
Subbu et al.

(10) Patent No.: US 12,664,906 B2
(45) Date of Patent: Jun. 23, 2026

(54) IMMERSIVE INTERVIEW WITH REAL-TIME INTERACTIVE FEEDBACK IN AUGMENTED REALITY

(71) Applicant: International Business Machines Corporation, Armonk, NY (US)

(72) Inventors: Uma Subbu, Chicago, IL (US); Natalia Russi-Vigoya, Round Rock, TX (US); Fiona G Wong, San Francisco, CA (US); Jennifer M. Hatfield, Portland, OR (US); Jill S. Dhillon, Jupiter, FL (US); Liliana Vasquez, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/527,640

(22) Filed: Dec. 4, 2023

(65) Prior Publication Data

US 2025/0182636 A1    Jun. 5, 2025

(51) Int. Cl.
    *G09B 5/02*      (2006.01)
    *G06T 11/10*     (2026.01)
    G06Q 10/1053     (2023.01)

(52) U.S. Cl.
    CPC ............... *G09B 5/02* (2013.01); *G06T 11/10* (2026.01); *G06Q 10/1053* (2013.01); *G06T 2200/24* (2013.01)

(58) Field of Classification Search
    CPC ...................................................... G09B 5/02
    See application file for complete search history.

(56) References Cited

U.S. PATENT DOCUMENTS

| | | | | |
|---|---|---|---|---|
| 10,665,268 B1 * | 5/2020 | Tanaka | ................... | G06V 40/20 |
| 2004/0018477 A1 * | 1/2004 | Olsen | ..................... | G09B 5/065 |
| | | | | 434/307 R |

(Continued)

FOREIGN PATENT DOCUMENTS

| | | |
|---|---|---|
| CN | 114360012 A | 4/2022 |
| KR | 20130044637 A | 5/2013 |
| WO | 2019004971 A2 | 1/2019 |

OTHER PUBLICATIONS

"About Mock-AI", Amcat, Printed May 17, 2023, 6 pages, <https://www.myamcat.com/products/mock-ai>.

(Continued)

*Primary Examiner* — Peter R Egloff
(74) *Attorney, Agent, or Firm* — Stephen R. Yoder

(57) ABSTRACT

In an approach for providing an immersive interview system with real-time interactive feedback, a processor presents a simulated environment of an interview based on an interview type and an interview format selected by a user. A processor collects a set of data regarding at least one performance related factor and nonperformance related factor for a length of the interview. A processor evaluates the set of data collected to detect a deficiency associated with the at least one performance related factor of the user. A processor detects the deficiency associated with the at least one performance related factor of the user. A processor outputs a notification to the user, wherein the notification is a recommendation explaining to the user a suggested change to improve the interview skill during the interview.

20 Claims, 14 Drawing Sheets

(56) References Cited

U.S. PATENT DOCUMENTS

| | | | | |
|---|---|---|---|---|
| 2004/0125127 A1* | 7/2004 | Liu | G09B 5/06 | 715/716 |
| 2004/0186743 A1 | 9/2004 | Angel, Jr. | | |
| 2012/0206577 A1* | 8/2012 | Guckenberger | G09B 19/003 | 348/47 |
| 2014/0106330 A1* | 4/2014 | Billhardt | G09B 7/02 | 434/324 |
| 2015/0317910 A1* | 11/2015 | Daniels | G09B 9/00 | 434/257 |
| 2016/0180737 A1* | 6/2016 | Clark | G09B 5/02 | 434/236 |
| 2020/0105156 A1* | 4/2020 | Naidu | G06N 20/00 | |
| 2021/0271864 A1 | 9/2021 | Litvin | | |
| 2022/0335854 A1* | 10/2022 | Gupta | H04N 5/76 | |
| 2022/0335940 A1* | 10/2022 | Poddar | G10L 15/22 | |
| 2022/0366811 A1* | 11/2022 | Donnelly | G06T 7/20 | |
| 2023/0316949 A1* | 10/2023 | Joshi | G09B 5/02 | |

OTHER PUBLICATIONS

"Future recruitment: How the metaverse will change how we hire", Silicon Republic, May 22, 2022, 5 pages, <https://www.siliconrepublic.com/careers/metaverse-recruitment-hiring-future-of-work>.

"Master the interview & land a job worth loving.", My Interview Practice, Printed May 17, 2022, 12 pages, <https://myinterviewpractice.com/>.

"New Employees, Come to Metaverse!", Hyundai Motor Group, Aug. 19, 2021, 10 pages, <https://www.hyundaimotorgroup.com/story/CONT0000000000001842>.

Anonymous, "Cognitive Interview," IP.com No. IPCOM000249189D, IP.com Electronic Publication Date: Feb. 9, 2017, 5 pages.

Anonymous, "Method and System for Assisting Users to Improve Performance in Interviews by Providing Feedback based on Mock Interviews," IP.com No. IPCOM000254822D, IP.com Electronic Publication Date: Aug. 7, 2018, 2 pages.

Anonymous, "Method and system for virtual reality based mock preparation with predicted Q&A," IP.com No. IPCOM000251696D, IP.com Electronic Publication Date: Nov. 27, 2017, 4 pages.

Anonymous, "System and Method to identify coaches and define goals in cognitive way," IP.com No. IPCOM000261130D, IP.com Electronic Publication Date: Feb. 2, 2020, 5 pages.

Gupta, Ruchi, "Here's How Accenture's Metaverse Job Onboarding Works", Market Realist, May 20, 2022, 9 pages, <https://marketrealist.com/p/accenture-metaverse-onboarding>.

Maclellan, Lila, "Training in the metaverse", Quartz, Jul. 10, 2022, 13 pages, <https://qz.com/emails/quartz-forecast/2186599/job-training-in-the-metaverse/>.

Pai, Sudhir, "The Metaverse: A New Frontier in Talent Engagement", Forbes, Jun. 17, 2022, 6 pages, <https://www.forbes.com/sites/forbestechcouncil/2022/06/17/the-metaverse-a-new-frontier-in-talent-engagement/?sh=7fa772643523>.

Unknown, "AHFE Technical Sessions [Jul. 2025]", Retrieved from: https://video.ibm.com/channel/BtLmFKzpJps, Retrieved from the Internet on Aug. 17, 2025, 2 pages.

Unknown, "Discover the Power of Movement SDK with a New Sample on Github", Retrieved from: https://developers.meta.com/horizon/blog/movement-sdk-sample-github-eye-tracking/, Nov. 18, 2022, 6 pages.

Unknown, "IBM Commits to Skill 30 Million People Globally by 2030", Retrieved from: https://newsroom.ibm.com/2021-10-13-IBM-Commits-to-Skill-30-Million-People-Globally-by-2030, Oct. 13, 2021, 5 pages.

Unknown, "IBM Impact", Retrieved from: https://www.ibm.com/downloads/documents/us-en/10a99803d62fd3a5, 2023 ESG Report, 74 pages.

Unknown, "Make the most of every call with the power of Engage AI", Retrieved from: https://www.jabra.com/software-and-services/jabra-engage-ai, Retrieved on: Dec. 4, 2022, 8 pages.

Unknown, "Sony is getting into the metaverse with a new motion-tracking system", Retrieved from: https://www.theverge.com/2022/11/30/23485732/sony-mocopi-motion-capture-metaverse-vr-avatar-announcement-price, Nov. 30, 2022, 4 pages.

Unknown, "Talent acquisition and skills development", Retrieved from: https://www.ibm.com/consulting/talent-acquisition?utm_content=SRCWW&p1=Search&p4=43700053852620921&p5=e&gclid=Cj0KCQjwkOqZBhDNARIsAACsbfJAnip47tp0lhtjqhKm m7xPVfmRT5FqqLsozx7XLCXyCrWhilE45nsaAgaWEALw_wcB&gclsrc=aw.ds, Retrieved from the Internet on Aug. 17, 2025, 13 pages.

* cited by examiner

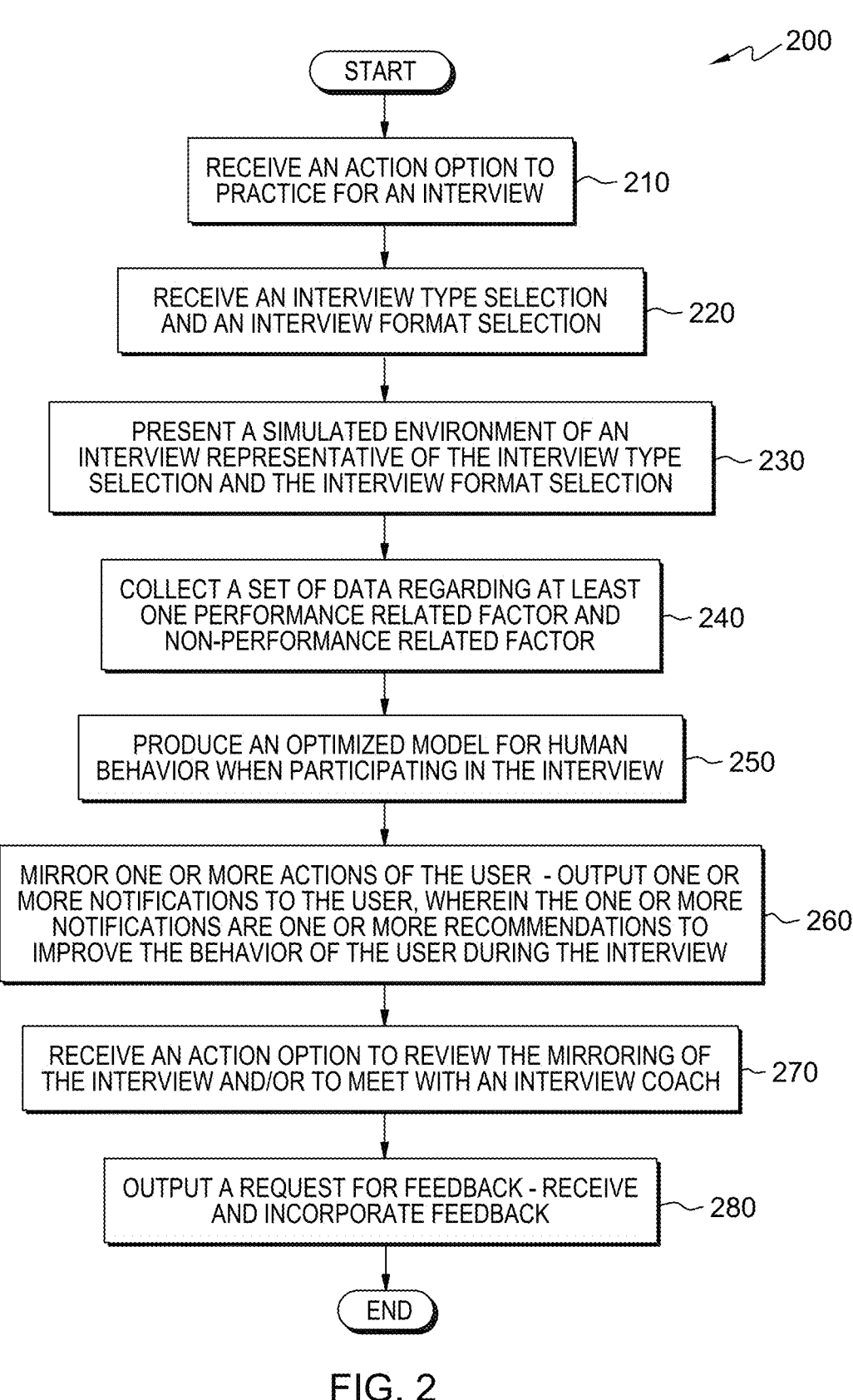

START

RECEIVE AN ACTION OPTION TO PRACTICE FOR AN INTERVIEW — 210

RECEIVE AN INTERVIEW TYPE SELECTION AND AN INTERVIEW FORMAT SELECTION — 220

PRESENT A SIMULATED ENVIRONMENT OF AN INTERVIEW REPRESENTATIVE OF THE INTERVIEW TYPE SELECTION AND THE INTERVIEW FORMAT SELECTION — 230

COLLECT A SET OF DATA REGARDING AT LEAST ONE PERFORMANCE RELATED FACTOR AND NON-PERFORMANCE RELATED FACTOR — 240

PRODUCE AN OPTIMIZED MODEL FOR HUMAN BEHAVIOR WHEN PARTICIPATING IN THE INTERVIEW — 250

MIRROR ONE OR MORE ACTIONS OF THE USER - OUTPUT ONE OR MORE NOTIFICATIONS TO THE USER, WHEREIN THE ONE OR MORE NOTIFICATIONS ARE ONE OR MORE RECOMMENDATIONS TO IMPROVE THE BEHAVIOR OF THE USER DURING THE INTERVIEW — 260

RECEIVE AN ACTION OPTION TO REVIEW THE MIRRORING OF THE INTERVIEW AND/OR TO MEET WITH AN INTERVIEW COACH — 270

OUTPUT A REQUEST FOR FEEDBACK - RECEIVE AND INCORPORATE FEEDBACK — 280

END

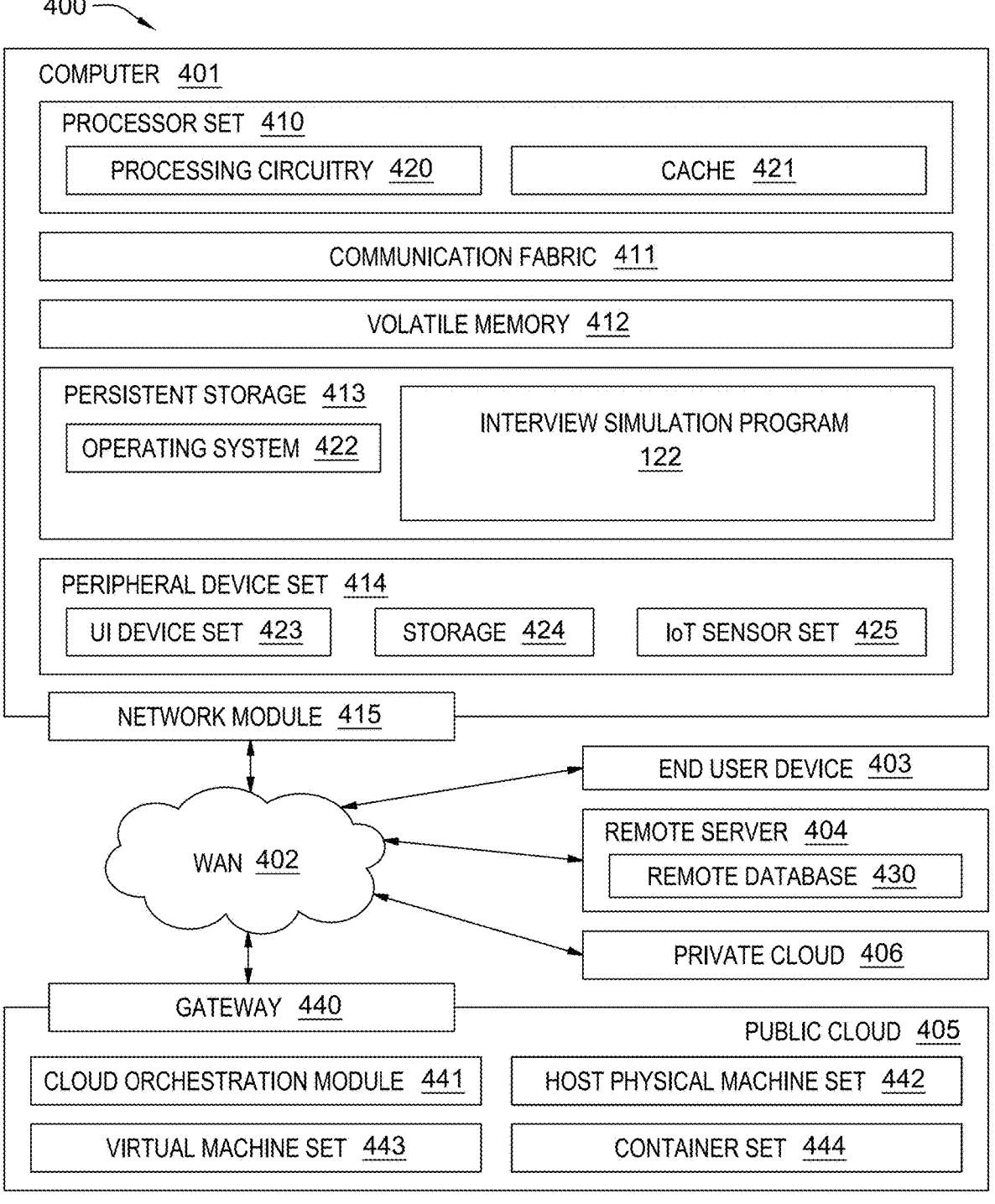

COMPUTER　401

PROCESSOR SET　410

PROCESSING CIRCUITRY　420

CACHE　421

COMMUNICATION FABRIC　411

VOLATILE MEMORY　412

PERSISTENT STORAGE　413

OPERATING SYSTEM　422

INTERVIEW SIMULATION PROGRAM
122

PERIPHERAL DEVICE SET　414

UI DEVICE SET　423

STORAGE　424

IoT SENSOR SET　425

NETWORK MODULE　415

WAN　402

END USER DEVICE　403

REMOTE SERVER　404

REMOTE DATABASE　430

PRIVATE CLOUD　406

GATEWAY　440

PUBLIC CLOUD　405

CLOUD ORCHESTRATION MODULE　441

HOST PHYSICAL MACHINE SET　442

VIRTUAL MACHINE SET　443

CONTAINER SET　444

FIG. 4

IMMERSIVE INTERVIEW WITH REAL-TIME INTERACTIVE FEEDBACK IN AUGMENTED REALITY

BACKGROUND OF THE INVENTION

The present invention relates generally to computer systems, and more specifically, to computer-implemented methods, computer systems, and computer program products configured and arranged for providing an immersive interview system with real-time interactive feedback in an augmented reality environment for a user.

Augmented reality (AR) is a live direct or indirect view of a physical, real-world environment the elements of which are augmented by computer-generated sensory input such as sound, video, graphics, or global positioning system (GPS) data. AR is related to a more general concept called computer-mediated reality, in which a view of reality is modified (possibly even diminished rather than augmented) by a computer. AR enhances one's current perception of reality, whereas in contrast, virtual reality replaces the real world with a simulated one. AR techniques are typically performed in real time and in semantic context with environmental elements, such as overlaying supplemental information like scores over a live video feed of a sporting event.

With the help of advanced AR technology (e.g., adding computer vision and object recognition), the information about the surrounding real world of the user becomes interactive and digitally manipulable. Information about the environment and its objects is overlaid on the real world. This information can be virtual or real, e.g., seeing other real sensed or measured information such as electromagnetic radio waves overlaid in exact alignment with where they are in space. AR brings the components of the digital world into a person's perceived real world.

Hardware components for AR include a processor, a display, sensors, and input devices. Modern mobile computing devices like smartphones and tablet computers contain these elements which often include a camera and microelectromechanical system (MEMS) sensors, such as an accelerometer, a GPS, and a solid-state compass, making them suitable AR platforms.

Various technologies are used in AR rendering including optical projection systems, monitors, hand-held devices, and display systems worn on the human body. A head-mounted display (HMD) is a display device paired to a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide virtual reality users mobile and collaborative experiences.

AR displays can be rendered on devices resembling eyeglasses. Versions include eyewear that employ cameras to intercept the real-world view and re-display its augmented view through the eye pieces and devices in which the AR imagery is projected through or reflected off the surfaces of the eyewear lens pieces. A heads-up display, also known as a HUD, is a transparent display that presents data without requiring users to look away from their usual viewpoints. Near eye AR devices can be used as portable head-up displays as they can show data, information, and images while the user views the real world. Many definitions of AR only define it as overlaying the information. This is basically what a heads-up display does; however, practically speaking, AR is expected to include registration and tracking between the superimposed perceptions, sensations, information, data, and images and some portion of the real world.

SUMMARY

Aspects of an embodiment of the present invention disclose a method, computer program product, and computer system for providing an immersive interview system with real-time interactive feedback in an augmented reality environment for a user, a processor presents a simulated environment of an interview based on an interview type and an interview format selected by a user. A processor collects a set of data regarding at least one performance related factor and nonperformance related factor for a length of the interview. A processor evaluates the set of data collected to detect a deficiency associated with the at least one performance related factor of the user. A processor detects the deficiency associated with the at least one performance related factor of the user. A processor outputs a notification to the user, wherein the notification is a recommendation explaining to the user a suggested change to improve the interview skill during the interview.

In some aspects of an embodiment of the present invention, prior to presenting the simulated environment of the interview based on the interview type and the interview format selected by the user, a processor enables the user to select the interview type from a plurality of interview type options. A processor enables the user to select the interview format from a plurality of interview format options.

In some aspects of an embodiment of the present invention, the plurality of interview format options include at least one of a one-on-one interview, a panel interview, and a company specific interview, and wherein the plurality of interview type options include at least one of a Behavioral Review option, a Technical Review option, and a Portfolio Review option.

In some aspects of an embodiment of the present invention, a processor mirrors one or more behaviors of the user on a user interface of a user computing device to the user during the length of the interview.

In some aspects of an embodiment of the present invention, the mirroring inserts one or more color-coded indicators to advise the user of one or more suggested changes in a presentation of the user during the interview.

In some aspects of an embodiment of the present invention, the mirroring inserts one or more flags to advise the user of one or more suggested changes in a body posture of the user during the interview.

In some aspects of an embodiment of the present invention, the mirroring inserts one or more prompts to advise the user of one or more suggested changes in a discussion content during the interview.

In some aspects of an embodiment of the present invention, a processor replays a mirroring to the user. A processor highlights a span of the mirroring associated with the recommendation.

In some aspects of an embodiment of the present invention, a processor replays the mirroring to the user and a coach selected by the user, simultaneously. A processor pauses the interview at one or more spans of the mirroring associated with the recommendations. A processor enables the coach to communicatively critique the interview with user.

In some aspects of an embodiment of the present invention, the coach is presented for selection based on a machine learning model to identify a match between the deficiency associated with the at least one performance related factor of the user during the interview and a coach proficient in the deficiency associated with the at least one performance related factor of the user.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 2 is a flowchart illustrating operational steps of an interview simulation program, on a server within the distributed data processing environment of FIG. 1, in accordance with an embodiment of the present invention;

FIG. 4 depicts a block diagram of components of a computing environment representing the distributed data processing environment of FIG. 1, in accordance with an embodiment of the present invention.

DETAILED DESCRIPTION

Embodiments of the present invention recognize that there are many resources available to help prepare an interviewer and/or an interviewee for an interview. Embodiments of the present invention, however, recognize that no immersive resource that engages an interviewee in all aspects of an interview exists. Therefore, embodiments of the present invention recognize the need for a system and method to enable an interviewee to practice for an interview and to receive notifications, recommendations, and mirrored feedback in real-time.

Embodiments of the present invention provide a system and method for providing an immersive interview system with real-time interactive feedback in an augmented reality environment for a user. The system presents a simulated environment of a general interview setup or a specific interview setup for a specific company. The simulated environment may be broad. For example, the simulated environment may provide a candidate with directions on how to navigate a building in which an interview will be held as well as directions on how to navigate a parking lot, a cafeteria, a bathroom, etc. associated with the building in which the interview will be held. The simulated environment may also be specific. For example, the simulated environment may provide an interviewee with an individual interview or a group interview. Through the simulated environment, an interviewer may simulate a culture similar to the type of culture the interviewee may expect during a real interview and a culture similar to what the interviewee may expect if hired by the interviewer. The system focuses on helping the interviewee showcase the interviewee's skills and helping the interviewer find the best candidate for the interviewer's position. The system evaluates the interviewee's verbal and non-verbal behavior and provides feedback, recommendations, and key pointers on general and specific areas of improvement throughout the interview process, following which the interviewee can view a mirror of the interviewee's entire interview performance. The system uses a machine learning model to assess the interviewee's overall performance. Following the interview experience, the interviewee may watch the mirroring to gain an in-depth view of what the interviewee did as well as what the interviewee can consider doing to improve. Additionally, the interviewee can connect with a coach, have regular check-ins, and build a relationship with the coach over time.

Implementation of embodiments of the present invention may take a variety of forms, and exemplary implementation details are discussed subsequently with reference to the Figures.

Figure 1:
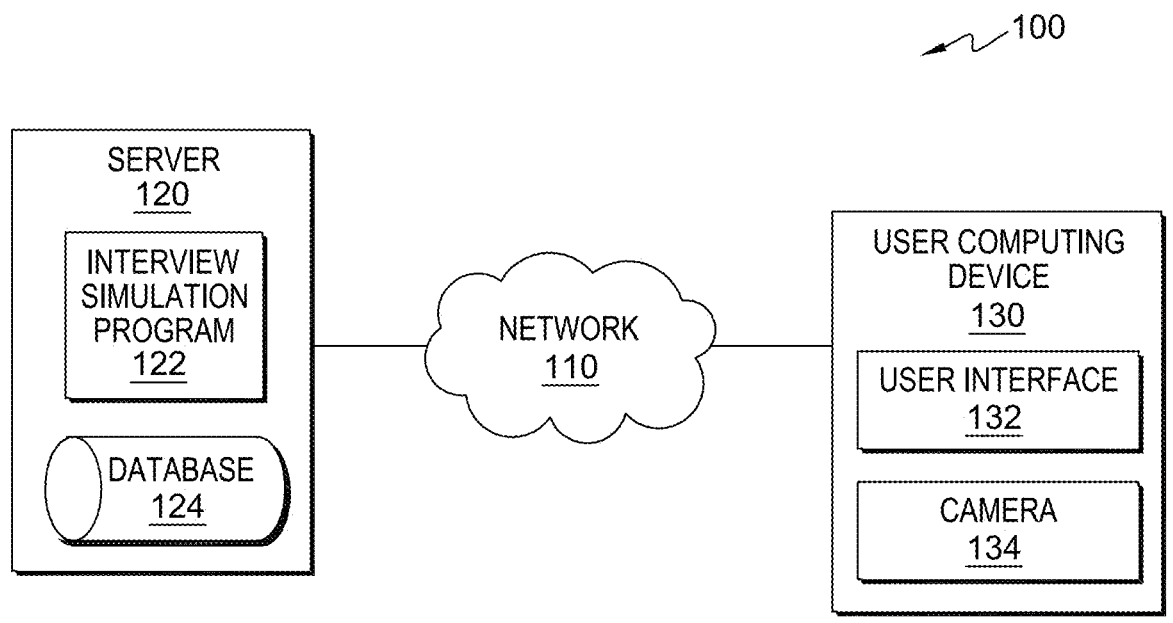
FIG. 1 is a functional block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to run interview simulation program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 4.

Interview simulation program 122 operates to provide an immersive interview system with real-time interactive feedback in an augmented reality environment (e.g., metaverse) for a user. Interview simulation program 122 presents a simulated environment of a general interview setup or a specific interview setup for a specific company. The simulated environment may be broad. For example, the simulated environment may provide a candidate with directions on how to navigate a building in which an interview will be held as well as with directions on how to navigate a parking lot, a cafeteria, a bathroom, etc. associated with the building in which the interview will be held. The simulated environment may also be specific. For example, the simulated environment may provide an interviewee with an individual interview or a group interview. Through the simulated environment, an interviewer may simulate a culture similar to the type of culture the interviewee may expect during a real interview and a culture similar to what the interviewee may expect if hired by the interviewer. Interview simulation program 122 focuses on helping the interviewee showcase the interviewee's skills and helping the interviewer find the best candidate for the interviewer's position. Interview simulation program 122 evaluates the interviewee's verbal and non-verbal behavior and provides feedback, recommendations, and key pointers on general and specific areas of improvement throughout the interview process in the augmented reality environment, following which the interviewee can view a mirror of the interviewee's entire interview performance. Interview simulation program 122 uses a machine learning model to assess the interviewee's overall performance. Following the interview experience in the augmented reality environment, the interviewee can watch the mirroring to gain an in-depth view of what the interviewee did as well as what the interviewee can consider doing to improve. Additionally, the interviewee can connect with a coach, have regular check-ins, and build a relationship with the coach over time. In the depicted embodiment, interview simulation program 122 is a standalone program. In another embodiment, interview simulation program 122 may be integrated into another software product. In the depicted embodiment, interview simulation program 122 resides on server 120. In another embodiment, interview simulation program 122 may reside on another computing device (not shown), provided that interview simulation program 122 has access to network 110. The operational steps of interview simulation program 122 are depicted and described in further detail with respect to FIG. 2.

In an embodiment, a user of user computing device 130 registers with interview simulation program 122 of server 120. For example, the user completes a registration process (e.g., user validation), provides information to create a user profile, and authorizes the collection, analysis, and distribution (i.e., opts-in) of relevant data on an identified computing device (e.g., on user computing device 130) by server 120 (e.g., via interview simulation program 122). Relevant data includes, but is not limited to, personal information or data provided by the user; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by interview simulation program 122. A database is an organized collection of data. Data includes, but is not limited to, information about user preferences (e.g., general user system settings such as alert notifications for user computing device 130); information about alert notification preferences; a set of data collected and measured regarding one or more actions made by the user and one or more biometrics associated with the one or more actions made by the user (e.g., a type of body language, a physical movement or physical gesture, a facial expression, an eye movement, a voice modulation, and a content of discussion spoken about by a user); a progress report on a performance of a user; a list of one or more best practices in an industry; a set of feedback input by a user; one or more points extracted from the set of feedback input by the user; and any other data received, used, and/or generated by interview simulation program 122.

Database 124 can be implemented with any type of device capable of storing data and configuration files that can be accessed and utilized by server 120, such as a hard disk drive, a database server, or a flash memory. In an embodiment, database 124 is accessed by interview simulation program 122 to store and/or to access the data. In the depicted embodiment, database 124 resides on server 120. In another embodiment, database 124 may reside on another server, cloud server, computing device, augmented reality device, or spread across multiple devices elsewhere (not shown) within distributed data processing environment 100, provided that interview simulation program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Interview simulation program 122 enables the authorized and secure processing of personal data and/or confidential company data.

Interview simulation program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Interview simulation program 122 provides information regarding personal and/or confidential company data and the nature (e.g., type, scope, purpose, duration, etc.) of the processing. Interview simulation program 122 provides the user with copies of stored personal and/or confidential company data. Interview simulation program 122 allows the correction or completion of incorrect or incomplete personal and/or confidential company data. Interview simulation program 122 allows for the immediate deletion of personal and/or confidential company data.

User computing device 130 operates to run user interface 132 through which a user can interact with interview simulation program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with interview simulation program 122 via network 110. In another embodiment, user computing device 130 is an augmented reality device. As used herein, the term augmented reality refers to any technique for augmenting a real-world environment, such as a live video captured through a camera or recorded video, using computer-generated sensory input, such as sound, video, graphics, or GPS data. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132 and camera 134.

User interface 132 operates as a local user interface between interview simulation program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from interview simulation program 122 to a user via network 110. User interface 132 can also display or present alerts including information (such as graphics, text, and/or sound) sent from interview simulation program 122 to a user via network 110. In an embodiment, user interface 132 can send and receive data (i.e., to and from interview simulation program 122 via network 110, respectively). Through user interface 132, a user can opt-in to interview simulation program 122; input information about the user; create a user profile; set user preferences and alert notification preferences; select an action option (e.g., practice interviewing and meet with a coach); select an interview format option (e.g., a one-on-one (1:1) interview, a panel interview, and a company specific interview); select an interview type option (e.g., a Behavioral Review option, a Technical Review option, and a Portfolio Review option); select a challenge option (e.g., a white board challenge and a coding challenge); input an answer to a plurality of Portfolio Review simulation questions (e.g., a number of slides included a portfolio (if applicable), a slide on which the user wants to focus during a presentation of a portfolio, a topic on which the user wants to focus during a presentation of a portfolio, a maximum amount of time allotted to present a portfolio (i.e., for the system to determine a key point the user needs to make by a particular time so that the user does not exceed a maximum amount of time allotted for a presentation of a portfolio), and a type of prompt to trigger a key point to be made in response to what is being shared and/or discussed at a particular point in time); select a prompt type option (e.g., speech and action); start and end an interview; participate in an interview; receive a notification with one or more recommendations to improve one or more behaviors of the user during an interview; review a mirroring; select a coach; meet with a coach; receive a request for feedback; and input feedback.

A user preference is a setting that can be customized for a particular user. A set of default user preferences are assigned to each user of interview simulation program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, one or more previous results of one or more iterations of interview simulation program 122.

FIG. 2 is a flowchart, generally designated 200, illustrating the operational steps for interview simulation program 122, on server 120 within distributed data processing environment 100 of FIG. 1, in accordance with an embodiment of the present invention. In an embodiment, interview simulation program 122 operates to provide an immersive interview system with real-time interactive feedback in an augmented reality environment for a user. It should be appreciated that the process depicted in FIG. 2 illustrates one possible iteration of the process flow, which may be repeated each time interview simulation program 122 is initiated by a user.

In step 210, responsive to a user initiating interview simulation program 122, interview simulation program 122 presents the user with a first screen (i.e., a welcome screen). In an embodiment, interview simulation program 122 presents the user with a first screen with an action option to practice for an interview. In some embodiments, interview simulation program 122 presents the user with a first screen with an action option to meet with a coach. In an embodiment, interview simulation program 122 presents the user with a first screen on a user interface (e.g., user interface 132) of a user computing device (e.g., user computing device 130). The first screen (i.e., the welcome screen with an action option to practice for an interview or to meet with a coach) presented to the user in step 210, for example, is depicted and described in FIG. 3A. In an embodiment, interview simulation program 122 enables the user to select the action option presented. In an embodiment, interview simulation program 122 enables the user to select the action option presented via the user interface (e.g., user interface 132) of the user computing device (e.g., user computing device 130). In an embodiment, interview simulation program 122 receives the action option selected by the user. In an embodiment, interview simulation program 122 reads the action option selected by the user.

In step 220, interview simulation program 122 presents the user with a second screen with a plurality of interview format options. In an embodiment, responsive to the user selecting the action option to practice for the interview, interview simulation program 122 presents the user with a second screen with a plurality of interview format options. In an embodiment, interview simulation program 122 presents the user with a second screen on the user interface (e.g., user interface 132) of the user computing device (e.g., user computing device 130). The plurality of interview format options include, but are not limited to, a one-on-one (1:1) interview, a panel interview, and a company specific interview. A company specific interview is created by a company. A company specific interview includes, but is not limited to, one or more rooms and one or more spaces matching a real-life environment of a company. The second screen with the plurality of interview format options presented to the user in step 220, for example, is depicted and described in FIG. 3B. In an embodiment, interview simulation program 122 enables the user to select an interview format option from the plurality of interview format options presented. In an embodiment, interview simulation program 122 enables the user to select an interview format option from the plurality of interview format options presented via the user interface (e.g., user interface 132) of the user computing device (e.g., user computing device 130). In an embodiment, interview simulation program 122 receives the interview format option selected by the user. In an embodiment, interview simulation program 122 reads the interview format option selected by the user.

In an embodiment, interview simulation program 122 presents the user with a third screen with a plurality of interview type options. In an embodiment, responsive to the user selecting the interview format option, interview simulation program 122 presents the user with a third screen with a plurality of interview type options. In an embodiment, interview simulation program 122 presents the user with a third screen on the user interface (e.g., user interface 132) of the user computing device (e.g., user computing device 130). The plurality of interview type options include, but are not limited to, a Behavioral Review option, a Technical Review option, and a Portfolio Review option. The third screen with the plurality of interview type options presented to the user in step 220, for example, is depicted and described in FIG. 3C. In an embodiment, interview simulation program 122 enables the user to select an interview type option from the plurality of options presented. In an embodiment, interview simulation program 122 enables the user to select an interview type option via the user interface (e.g., user interface 132) of the user computing device (e.g., user computing device 130). In an embodiment, interview simulation program 122 receives the interview type option selected by the user. In an embodiment, interview simulation program 122 reads the interview type option selected by the user.

In an embodiment, responsive to the user selecting the Behavioral Review option, interview simulation program 122 presents a simulated environment of an interview based on the interview format and type selected to the user. In an embodiment, interview simulation program 122 enables the user to perform the interview in the simulated environment presented. In an embodiment, responsive to the user performing the interview in the simulated environment, interview simulation program 122 records the user performing the interview. In an embodiment, interview simulation program 122 records the user performing the interview via a camera (i.e., via camera 134). In an embodiment, interview simulation program 122 enables the user to choose to view a mirroring of the interview, but without a presentation provided. In an embodiment, interview simulation program 122 enables the user to choose to view the mirroring via a user interface (e.g., user interface 132) of a user computing device (user computing device 130).

In another embodiment, responsive to the user selecting the Technical Review option, interview simulation program 122 presents the user with a fourth screen with two or more challenge options. The two or more challenge options may include, but are not limited to, a Whiteboard Challenge and a Coding Challenge. The Whiteboard Challenge is a challenge presented by the interviewer to the interviewee. The Whiteboard Challenge may involve, but is not limited to, the interviewer presenting the interviewee with a task to perform, the interviewee performing the task on the whiteboard, the interviewer observing the interviewee performing the task, and the interviewer evaluating the interviewee's design processing skills. The Coding Challenge is a challenge presented by the interviewer to the interviewee. The Coding Challenge may involve, but is not limited to, the interviewer assessing the interviewee's coding skills and problem-solving abilities. In an embodiment, interview simulation program 122 enables the user to select a challenge option presented. In an embodiment, interview simulation program 122 enables the user to select a challenge option presented via the user interface (e.g., user interface 132) of the user computing device (e.g., user computing device 130). In an embodiment, interview simulation program 122 receives the challenge option selected by the user. In an embodiment, interview simulation program 122 reads the challenge option selected by the user.

In another embodiment, responsive to the user selecting the Portfolio Review option, interview simulation program 122 presents the user with a fifth screen with a plurality of portfolio review simulation questions for the user to answer. The plurality of portfolio review simulation questions are in regards to details including, but not limited to, a number of slides included a portfolio (if applicable), a slide on which the user wants to focus during a presentation of a portfolio, a topic on which the user wants to focus during a presentation of a portfolio, a maximum amount of time allotted to present a portfolio (i.e., for the system to determine a key point the user needs to make by a certain time during a presentation of a portfolio so that the user does not exceed the maximum amount of time allotted), and a type of prompt to trigger a key point to be made during a presentation of a portfolio in response to what is being shared and/or discussed at a particular point in time. The fifth screen with the plurality of portfolio review simulation questions displayed, for example, is depicted and described in FIG. 3D.

In an embodiment, interview simulation program 122 presents a sixth screen with one or more prompt type options. The one or more prompt type options may include, but are not limited to, a prompt based on speech and a prompt based on an action. A prompt based on speech refers to a prompt provided when the user speaks a pre-selected word, phrase, and/or sentence. The sixth screen with the one or more prompt type options displayed, for example, is depicted and described in FIG. 3E. For example, interview simulation program 122 enables the user to input a word, a phrase, and/or a sentence that the user plans to speak to request a prompt. When the word, the phrase, and/or the sentence is spoken by the user, interview simulation program 122 prompts the user with the appropriate information. A prompt based on action refers to a prompt provided when the user performs a pre-selected action and/or behavior. For example, interview simulation program 122 enables the user to input an action and/or behavior that the user plans to perform to request a prompt. When the action and/or behavior is performed, interview simulation program 122 prompts the user with the appropriate information. In an embodiment, interview simulation program 122 enables the user to select a prompt type option from the one or more prompt type options. In an embodiment, interview simulation program 122 enables the user to select a prompt type option from the one or more prompt type options via the user interface (e.g., user interface 132) of the user computing device (e.g., user computing device 130). In an embodiment, interview simulation program 122 receives the prompt type option selected by the user. In an embodiment, interview simulation program 122 reads the prompt type option selected by the user.

In step 230, interview simulation program 122 presents a simulated environment of an interview. In an embodiment, interview simulation program 122 presents a simulated environment of an interview to the user via a user interface (e.g., user interface 132) of a user computing device (e.g., user computing device 130). In an embodiment, interview simulation program 122 presents a simulated environment of an interview representative of the interview format and the interview type selected by the user (i.e., in step 220). In an embodiment, interview simulation program 122 enables the user to start a simulation of a practice interview. In an embodiment, interview simulation program 122 enables the user to start a simulation of a practice interview via a user interface (e.g., user interface 132) of a user computing device (e.g., user computing device 130). In an embodiment, interview simulation program 122 enables a user to participate in the simulation of the practice interview.

In step 240, concurrently with steps 250 and 260, interview simulation program 122 collects a set of data associated with one or more performance and non-performance related factors. In an embodiment, interview simulation program 122 tracks one or more performance related factors. In an embodiment, interview simulation program 122 tracks one or more performance related factors for the length of the simulation of the practice interview (i.e., beginning when the user starts the simulation of the practice interview and ending when the user ends the simulation of the practice interview). The one or more performance related factors include, but are not limited to, a facial expression, a body language, and a voice modulation. In an embodiment, interview simulation program 122 tracks one or more performance related factors by recording one or more actions made by the user. In an embodiment, interview simulation program 122 measures one or more biometrics associated with the one or more actions recorded. The one or more actions recorded include, but are not limited to, a facial movement, an eye movement, a set of physical movements or physical gestures, a motion or a set of motions, and a tone of voice. In an embodiment, interview simulation program 122 records a facial movement of the user using an inward-facing camera (e.g., camera 134) on a user computing device (e.g., user computing device 130). In an embodiment, interview simulation program 122 records a facial movement to examine a facial expression of the user. In an embodiment, interview simulation program 122 records an eye movement of the user using an inward-facing camera (e.g., camera 134) on a user computing device (e.g., user computing device 130). In an embodiment, interview simulation program 122 records an eye movement to examine a facial expression of the user. In an embodiment, interview simulation program 122 records a motion made by the user. In an embodiment, interview simulation program 122 records a motion made by the user to examine a body language of the user. In an embodiment, interview simulation program 122 records a tone of voice of the user. In an embodiment, interview simulation program 122 records a tone of voice of the user to examine a voice modulation of the user. In an embodiment, interview simulation program 122 examines a voice modulation of the user to analyze a content of discussion spoken about by the user. In an embodiment, interview simulation program 122 displays a camera. In an embodiment, interview simulation program 122 displays a camera on a user interface (e.g., user interface 132) of a user computing device (e.g., user computing device 130). In an embodiment, interview simulation program 122 displays a camera to notify the user that an action the user is making is being recorded. In an embodiment, interview simulation program 122 displays a microphone. In an embodiment, interview simulation program 122 displays a microphone on a user interface (e.g., user interface 132) of a user computing device (e.g., user computing device 130). In an embodiment, interview simulation program 122 displays a microphone to notify the user that a word the user is speaking is being recorded. In an embodiment, interview simulation program 122 tracks one or more non-performance related factors. The one or more non-performance related factors include, but are not limited to, a time component, a slide the user is presenting, and a topic the user is discussing. In an embodiment, interview simulation program 122 tracks a time component (i.e., a time associated with a component of the interview). In an embodiment, interview simulation program 122 tracks a time component to monitor when a time exceeds a pre-set threshold. In an embodiment, responsive to a time exceeding a pre-set threshold, interview simulation program 122 outputs a notification, alerting the user of the timing issue (i.e., in step 260). In an embodiment, when the user selects a Technical Review interview option, interview simulation program 122 tracks a time component associated with a maximum amount of time allotted for a Whiteboard Challenge and a maximum amount of time allotted for a Coding Challenge. In an embodiment, when the user selects a Portfolio Review interview option, interview simulation program 122 tracks a time component associated with a number of slides included a portfolio (if applicable), a slide on which the user wants to focus during a presentation of a portfolio, a topic on which the user wants to focus during a presentation of a portfolio, a maximum amount of time allotted to present a portfolio (i.e., for the system to determine a key point the user needs to make by a certain time during a presentation of a portfolio so that the user does not exceed the maximum amount of time allotted), and a type of prompt to trigger a key point to be made during a presentation of a portfolio in response to what is being shared and/or discussed at a particular point in time.

In step 250, concurrently with steps 240 and 260, interview simulation program 122 produces an optimized model for human behavior (i.e., when participating in an interview). In an embodiment, interview simulation program 122 produces a baseline for human behavior (i.e., when participating in an interview). In an embodiment, interview simulation program 122 produces a baseline for human behavior from the one or more performance related factors tracked (i.e., in step 240). In an embodiment, interview simulation program 122 compares the baseline for human behavior to the one or more performance related factors tracked. In an embodiment, interview simulation program 122 identifies a performance related factor that is deficient (i.e., falls below the baseline for human behavior produced). In an embodiment, interview simulation program 122 identifies a change needed to be made to the performance related factor that is deficient. In an embodiment, interview simulation program 122 identifies a limitation of the user. In an embodiment, interview simulation program 122 produces an optimized model for human behavior. In an embodiment, interview simulation program 122 produces an optimized model for human behavior using a machine learning model. In an embodiment, interview simulation program 122 produces an optimized model for human behavior that incorporates the change needed to be made to the performance related factor and the limitation of the user.

In step 260, concurrently with steps 240 and 250, interview simulation program 122 mirrors one or more actions (e.g., one or more behaviors) of the user. A mirror includes, but is not limited to, a presentation timeline, a listing of one or more actions of the user, and a listing of one or more recommendations made by interview simulation program 122 to the user. The presentation timeline includes, but is not limited to, one or more areas of improvement noted and marked in a red color and one or more highlighted spans of time associated with one or more recommendations made by interview simulation program 122 to the user. In an embodiment, interview simulation program 122 mirrors one or more actions made by the user for the length of the simulation of the practice interview (i.e., beginning when the user starts the simulation of the practice interview and ending when the user ends the simulation of the practice interview). In an embodiment, interview simulation program 122 outputs one or more notifications. In an embodiment, interview simulation program 122 outputs one or more notifications to the user via a user interface (e.g., user interface 132) of a user computing device (e.g., user computing device 130). In an embodiment, interview simulation program 122 outputs one or more notifications for the length of the simulation of the practice interview (i.e., beginning when the user starts the simulation of the practice interview and ending when the user ends the simulation of the practice interview). The one or more notifications include, but are not limited to, a prompt based on speech, a prompt based on action, a color-coded indicator, a flag, a key pointer, and one or more recommendations to improve one or more behaviors of the user based on the set of data collected. In some embodiments, interview simulation program 122 outputs one or more notifications to alert the user of a timing issue. In some embodiments, interview simulation program 122 outputs one or more notifications to alert the user of a suggested change in a body posture (e.g., when the user is slouching or when the user is crossing the user's legs). In some embodiments, interview simulation program 122 outputs one or more notifications to alert the user of a suggested change in a content of a discussion. In some embodiments, interview simulation program 122 outputs one or more notifications to advise the user to perform an action. In some embodiments, interview simulation program 122 outputs one or more notifications to advise the user to say a prompted word. A user interface displaying an implementation of a mirroring process during a simulation of a practice interview, for example, is depicted and described in FIG. 3G.

For example, interview simulation program 122 outputs a prompt to advise the user when the user is off track with timing. In another example, interview simulation program 122 changes a color of a user interface (e.g., user interface 132) of a user computing device (e.g., user computing device 130) when the user is off track with timing. Interview simulation program 122 changes a color of the user interface (e.g., user interface 132) of the user computing device (e.g., user computing device 130) to coordinate with whether the user is on track (e.g., green) or off track (i.e., behind or ahead of time, e.g., red). Interview simulation program 122 changes a color of the user interface (e.g., user interface 132) of the user computing device (e.g., user computing device 130) (i.e., using a color-coded indicator) to advise the user of a suggested change in the presentation. In another example, interview simulation program 122 outputs a flag to advise the user of a suggested change in a body posture (e.g., when the user is slouching but should be sitting up straight). In another example, interview simulation program 122 outputs a prompt to advise the user of a change in a content of a discussion. In yet another example, interview simulation program 122 outputs a key pointer to advise the user to perform an action (e.g., "steepling hand" to trigger a helpful pointer for a discussion) or to say a prompted word.

In step 270, responsive to the user ending the simulation of the practice interview, interview simulation program 122 presents a seventh screen (i.e., an interview completion screen). In an embodiment, interview simulation program 122 presents a seventh screen with two or more action options. The two or more action options include, but are not limited to, an option to review the mirroring of the simulation of the practice interview (i.e., independently) and an option to meet with an interview coach to discuss the simulation of the practice interview. In an embodiment, interview simulation program 122 presents a seventh screen to a user on a user interface (e.g., user interface 132) of a user computing device (e.g., user computing device 130). In an embodiment, interview simulation program 122 enables the user to select an action option from the two or more action options displayed. In an embodiment, interview simulation program 122 enables the user to select an action option via a user interface (e.g., user interface 132) of a user computing device (e.g., user computing device 130). In an embodiment, interview simulation program 122 receives the action option selected by the user. In an embodiment, interview simulation program 122 reads the action option selected by the user. The seventh screen (i.e., the interview completion screen with the action option to review the mirroring of the simulation of the practice interview independently or to meet with the interview coach to discuss the simulation of the practice interview) presented to the user in step 270, for example, is depicted and described in FIG. 3H. A user interface displaying a mirroring component, for example, is depicted and described in FIG. 3I.

In an embodiment, responsive to receiving the action option to review the mirroring of the simulation of the interview (i.e., independently), interview simulation program 122 enables the user to review (e.g., replay) the mirroring. In an embodiment, interview simulation program 122 enables the user to review the mirroring on the user interface (e.g., user interface 132) of the user computing device (e.g., user computing device 130). In an embodiment, interview simulation program 122 highlights one or more spans of the mirroring associated with one or more recommendations made by interview simulation program 122 to the user In an embodiment, responsive to receiving the action option to meet with the interview coach to discuss the simulation of the practice interview, interview simulation program 122 connects the user with a coach. In an embodiment, if the user does not have a previously assigned coach, interview simulation program 122 identifies one or more potential coaches. In an embodiment, interview simulation program 122 identifies one or more potential coaches using a machine learning model trained to identify a match between the deficiency associated with the at least one performance related factor of the user during the interview and a coach proficient in the deficiency associated with the at least one performance related factor of the user. In an embodiment, interview simulation program 122 generates a list of the one or more potential coaches identified. In an embodiment, interview simulation program 122 presents the list of the one or more potential coaches identified to the user via a user interface (e.g., user interface 132) of a user computing device (e.g., user computing device 130). In an embodiment, interview simulation program 122 enables the user to select a coach from the list of the one or more potential coaches identified via a user interface (e.g., user interface 132) of a user computing device (e.g., user computing device 130). In another embodiment, if the user has a previously assigned coach, interview simulation program 122 sets up a space for the user to meet with the previously assigned coach. In an embodiment, interview simulation program 122 replays the mirroring to the user and a coach selected by the user, simultaneously. In an embodiment, interview simulation program 122 pauses the simulation of the practice interview at one or more spans of the mirroring associated with the recommendations, enabling the coach to communicatively critique the simulation of the practice interview with the user.

In step 280, interview simulation program 122 outputs a request for feedback to the user. In an embodiment, interview simulation program 122 outputs a request for feedback to the user via a user interface (e.g., user interface 132) of a user computing device (e.g., user computing device 130). In an embodiment, interview simulation program 122 outputs a request for feedback to the user to determine whether the user has a positive reaction or a negative reaction to the simulation of the practice interview and to the one or more recommendations provided during the simulation of the practice interview as well as to continuously improve a performance of interview simulation program 122. The feedback requested includes, but is not limited to, a positive reaction or a negative reaction to the simulation of the practice interview and to the one or more recommendations provided during the simulation of the practice interview. The positive reaction includes, but is not limited to, an acceptance of a recommendation provided and an indication that the simulation of the practice interview was helpful (e.g., asking the user whether the overall simulation of the practice interview was helpful and having the user respond by selecting "Yes/Thumbs Up"). The negative reaction includes, but is not limited to, a disapproval of a recommendation provided and an indication that the simulation of the practice interview was not helpful (e.g., asking the user whether the overall simulation of the practice interview was helpful and having the user respond by selecting "No/Thumbs Down").

In an embodiment, interview simulation program 122 enables the user to input the feedback. In an embodiment, interview simulation program 122 enables the user to input the feedback through a user interface (e.g., user interface 132) of a user computing device (e.g., user computing device 130). For example, in response to asking the user whether the overall simulation of the practice interview was helpful, the user may respond by selecting "Yes/Thumbs Up" or "No/Thumbs Down." An optional comment box may appear for the user to input specific thoughts and/or feedback. The user may input specific thoughts and/or feedback by typing or by speaking.

In an embodiment, interview simulation program 122 captures the feedback input by the user. In another embodiment, interview simulation program 122 captures the feedback without user intervention by monitoring the voice of the user (e.g., through a microphone). In an embodiment, interview simulation program 122 parses the feedback using a machine learning model. In an embodiment, interview simulation program 122 extracts one or more points from the feedback. In an embodiment, interview simulation program 122 incorporates the feedback into a reinforcement learning model. In an embodiment, interview simulation program 122 incorporates the feedback into a reinforcement learning model to improve the optimized model for human behavior produced (i.e., for participating in a simulation of a practice interview). In another embodiment, interview simulation program 122 incorporates the feedback into a reinforcement learning model to improve a simulation of a current and/or future practice interview. In another embodiment, interview simulation program 122 incorporates the feedback into a reinforcement learning model to improve the one or more recommendations output to the user. In an embodiment, interview simulation program 122 incorporates the feedback into a reinforcement learning model to adjust one or more factors of the simulation of the practice interview to continually optimize the simulation. In an embodiment, interview simulation program 122 uses the feedback provided by the user to gain an insight into how interview simulation program 122 may improve. In an embodiment, interview simulation program 122 uses the feedback provided by the user to become more accurate and helpful over time. In an embodiment, interview simulation program 122 updates a database (e.g., database 124) with the one or more points extracted from the feedback. In an embodiment, interview simulation program 122 stores the one or more points in the database (e.g., database 124). In an embodiment, interview simulation program 122 updates a database (e.g., database 124) with a progress report of the user's performance. In an embodiment, interview simulation program 122 stores the progress report of the user's performance in the database (e.g., database 124). Interview simulation program 122 uses the feedback provided by the user and the progress report of the user's performance the next time the user logs in to use interview simulation program 122. Interview simulation program 122 learns how to best aid and assist the user reach the user's goals. Interview simulation program 122 learns how to identify areas of strong performance and weak performance by observing and learning from both successful and unsuccessful interviews.

In a first example of interview simulation program 122, user A has an interview scheduled with technology company B. User A is an expert in a specific domain and is excited about the opportunity. User A is not skilled at interviewing but wants to do user A's best in the interview User A is unsure of many things. For example, user A is unsure of the culture of the organization and the type of questions that may be asked of user A. Additionally, the interview scheduled with technology company B is in a different city. User A is unsure of where to park, where to stay, and where to eat. In preparation for the interview, technology company B sent user A a link to an immersive platform employing interview simulation program 122 to practice. User A can practice for a portfolio presentation and a team interview and can get feedback on the spot. On the day of the interview, user A felt very comfortable because user A learned how to showcase user A's self in the best way possible, and also because user A was familiar with the environment and went into the interview having clear expectations.

In a second example of interview simulation program 122, user C wants to transition into a new career in a creative industry. User C works in a technical field and has never had any interview experience showcasing user C's portfolio. User C is aware that an opportunity to work as a Creative Designer for a company requires a strong portfolio and excellent presentation skills. User C is not confident about user C's portfolio review presentation skills. User C practiced user C's portfolio review presentation skills in an immersive mirrored environment employing interview simulation program 122. As user C went through the portfolio review interview type simulation, user C was notified of one or more recommendations regarding how user C could improve user C's performance. Following the portfolio review interview type simulation, user C watched the mirroring to get an in-depth view of what user C did, and what user C could do to enhance user C's performance the next time.

Figure 3A:
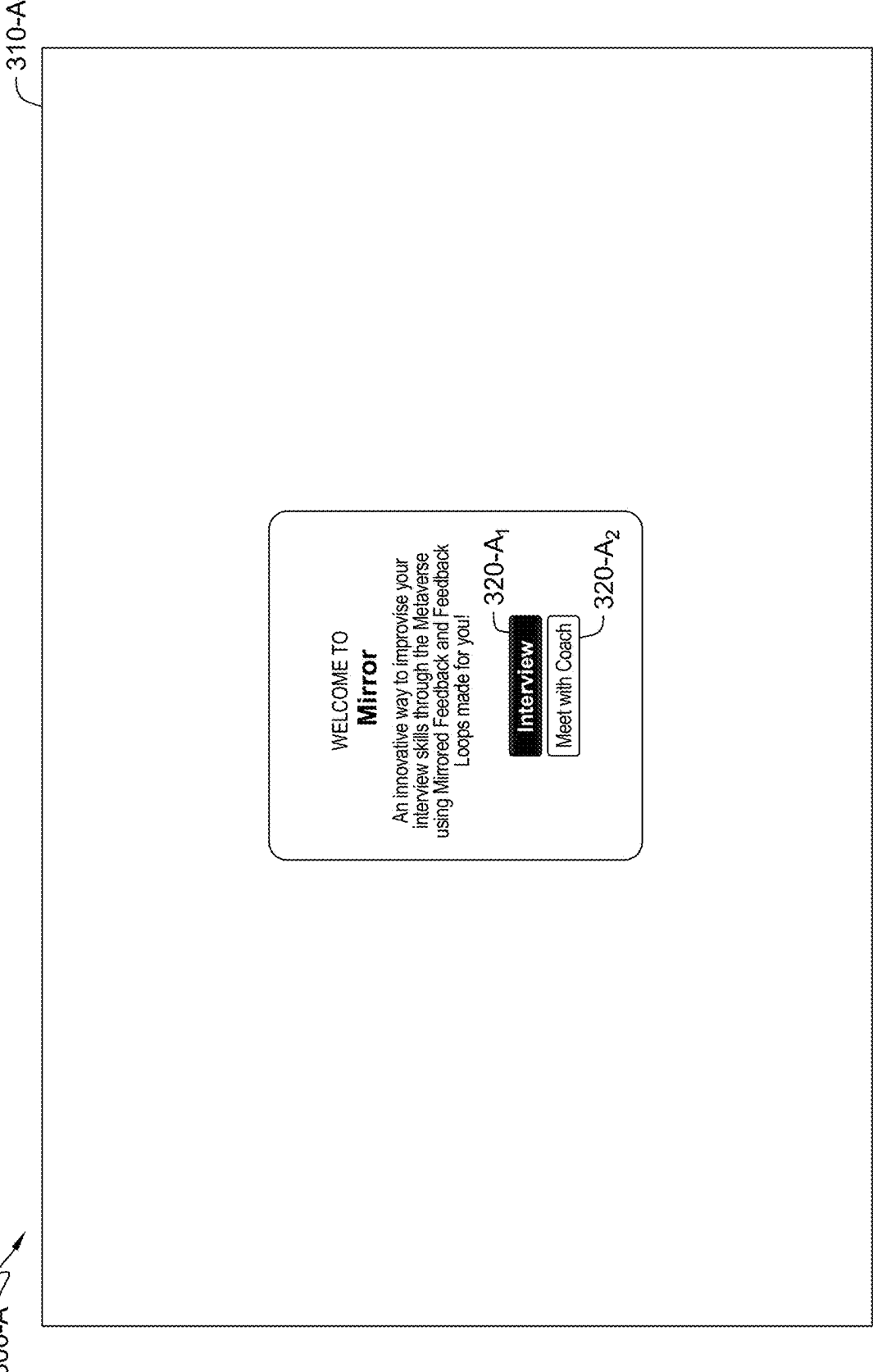
FIG. 3A depicts an example of a user interface displaying a first screen with one or more action options, in accordance with an embodiment of the present invention.

FIG. 3A depicts an example, generally designated 300-A, of a user interface displaying a first screen with two or more action options, in accordance with an embodiment of the present invention. Interview simulation program 122 presents the first screen (i.e., a welcome screen), generally designated 310-A, with two or more action options on the user interface (e.g., user interface 132) of the user computing device (e.g., user computing device 130). The two or more action options include practice interviewing 320-$A_1$ and meet with a coach 320-$A_2$. Interview simulation program 122 enables the user to select an action option from the two or more action options displayed via the user interface (e.g., user interface 132) of the user computing device (e.g., user computing device 130). It should be appreciated that FIG. 3A provides only an illustration of one implementation and does not imply any limitations with regard to the environments in which different embodiments can be implemented. Many modifications to the depicted environment can be made.

Figure 3B:
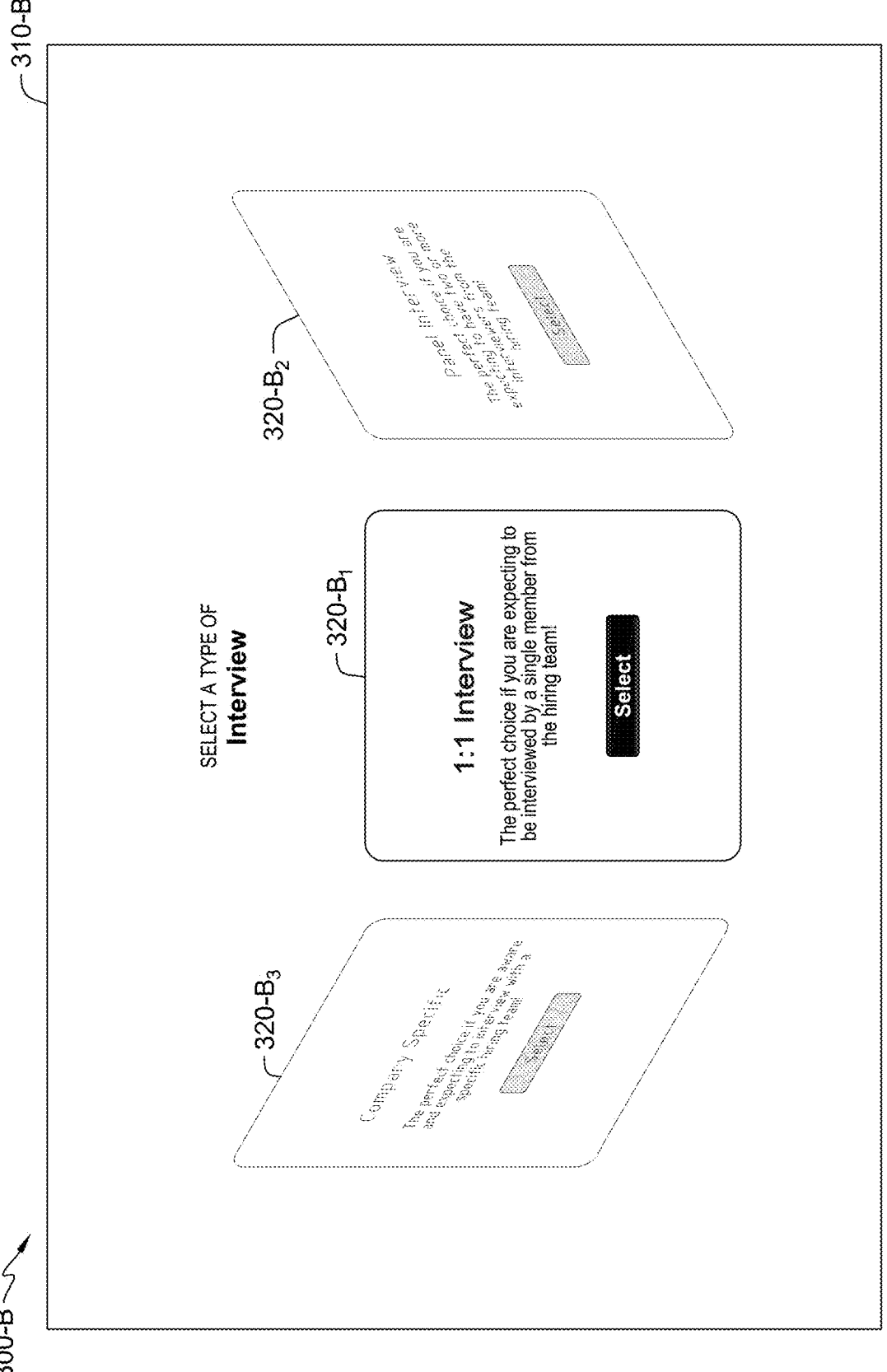
FIG. 3B depicts an example of the user interface displaying a second screen with a selection of a one-on-one (1:1) interview format option from a plurality of interview format options displayed, in accordance with an embodiment of the present invention.

FIG. 3B depicts an example, generally designated 300-B, of a user interface displaying a second screen with a selection of a one-on-one (1:1) interview format option from a plurality of interview format options displayed, in accordance with an embodiment of the present invention. Interview simulation program 122 presents a second screen, generally designated 310-B, with a plurality of interview format options on the user interface (e.g., user interface 132) of the user computing device (e.g., user computing device 130). The plurality of interview format options include one-on-one (1:1) interview 320-$B_1$, panel interview 320-$B_2$, and company specific interview 320-$B_3$. Interview simulation program 122 enables the user to select an interview format option from the plurality of interview format options displayed via the user interface (e.g., user interface 132) of the user computing device (e.g., user computing device 130). It should be appreciated that FIG. 3B provides only an illustration of one implementation and does not imply any limitations with regard to the environments in which different embodiments can be implemented. Many modifications to the depicted environment can be made.

Figure 3C:
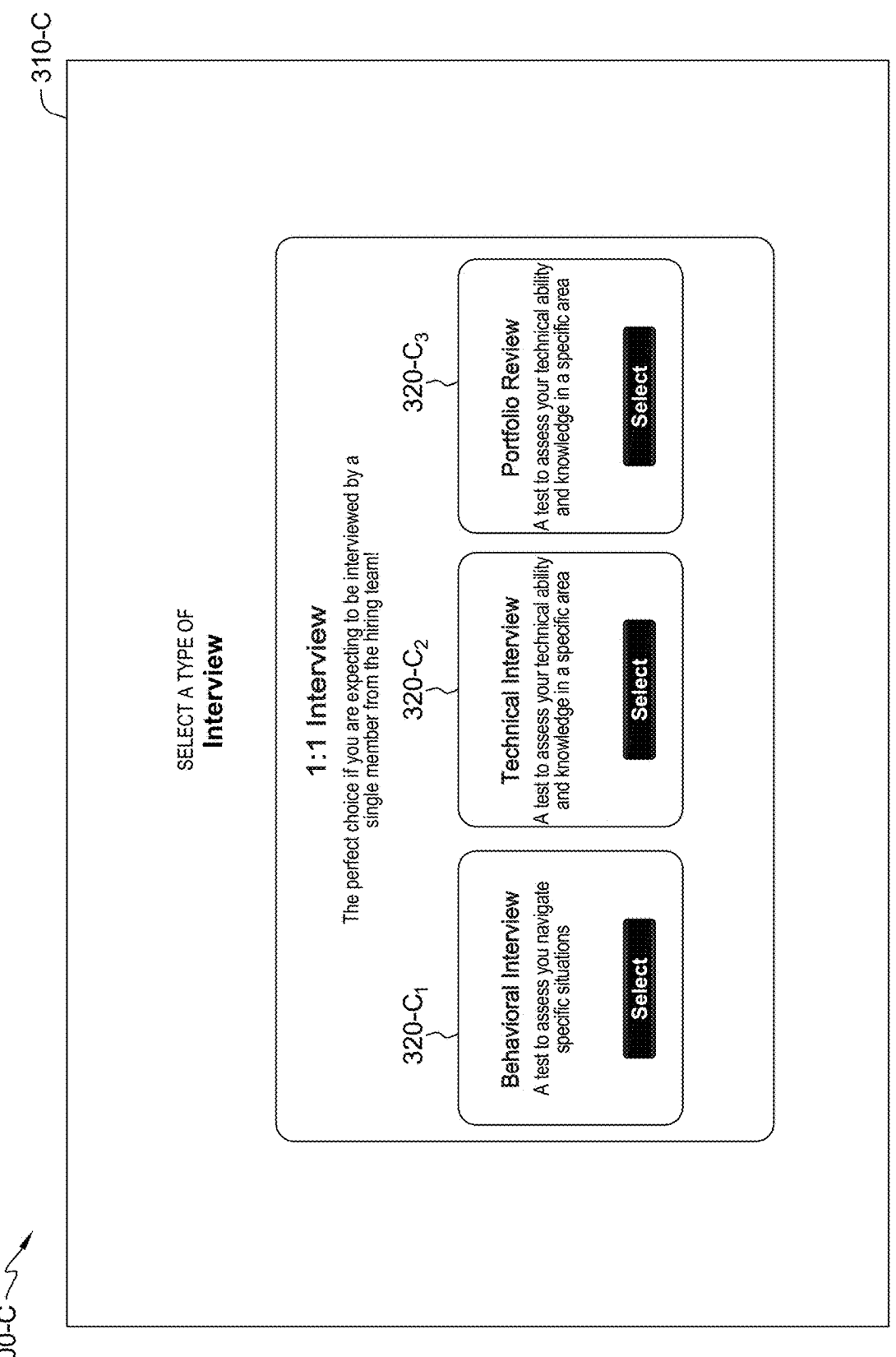
FIG. 3C depicts an example of the user interface displaying a third screen with a plurality of interview type options, in accordance with an embodiment of the present invention.

FIG. 3C depicts an example, generally designated 300-C, of a user interface displaying a third screen with a plurality of interview type options, in accordance with an embodiment of the present invention. Interview simulation program 122 presents a third screen, generally designated 310-C, with a plurality of interview type options on the user interface (e.g., user interface 132) of the user computing device (e.g., user computing device 130). The plurality of interview type options include Behavioral Review option 320-$C_1$, Technical Review option 320-$C_2$, and Portfolio Review option 320-$C_3$. Interview simulation program 122 enables the user to select an interview type option from the plurality of options displayed via the user interface (e.g., user interface 132) of the user computing device (e.g., user computing device 130). It should be appreciated that FIG. 3C provides only an illustration of one implementation and does not imply any limitations with regard to the environments in which different embodiments can be implemented. Many modifications to the depicted environment can be made.

Figure 3D:
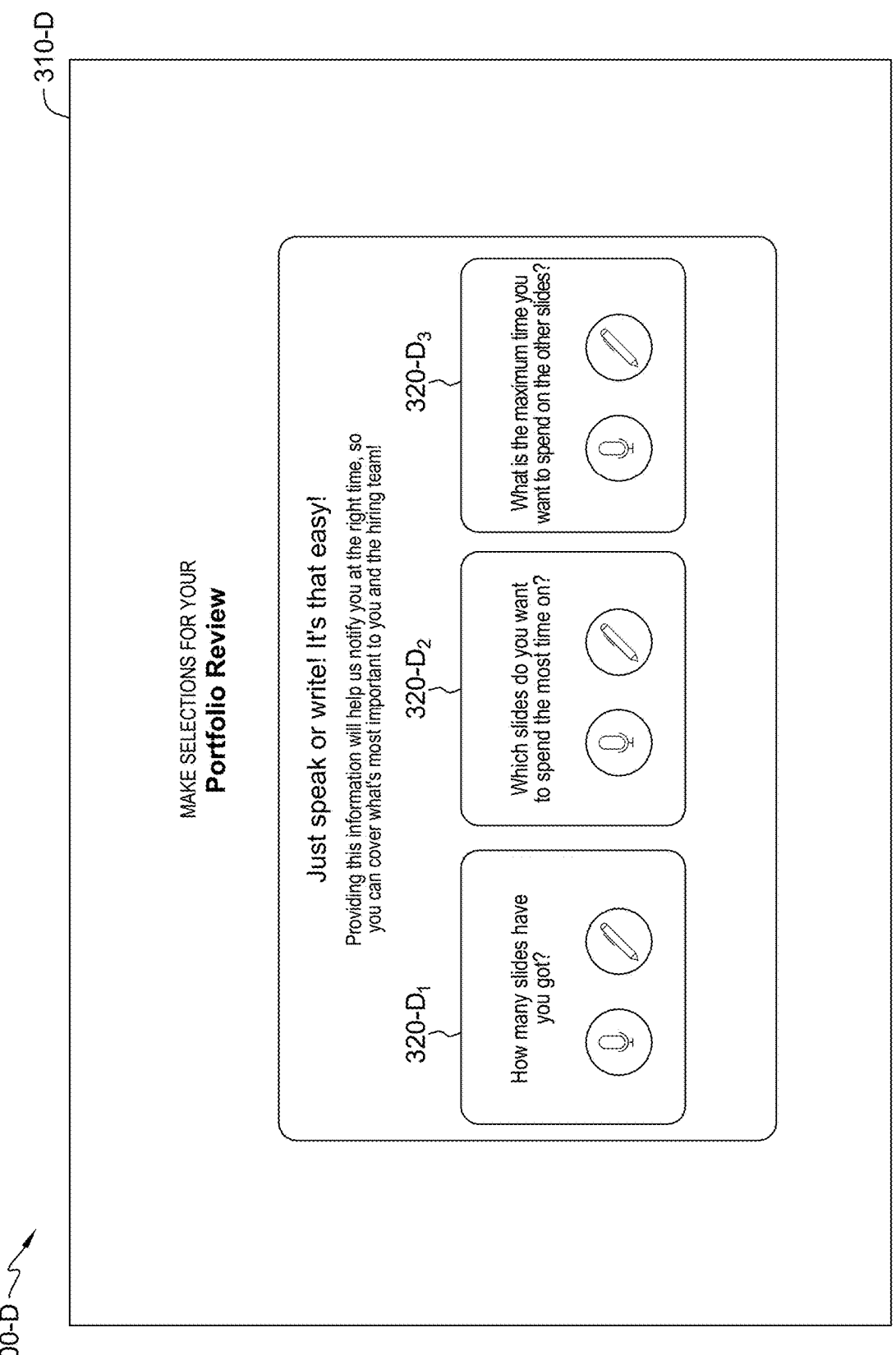
FIG. 3D depicts an example of the user interface displaying a fifth screen with a portfolio review simulation with a plurality of initial selection questions for the user to answer, in accordance with an embodiment of the present invention.

FIG. 3D depicts an example, generally designated 300-D, of a user interface displaying a fifth screen with a portfolio review simulation with a plurality of initial selection questions for the user to answer, in accordance with an embodiment of the present invention. Interview simulation program 122 presents a fifth screen, generally designated 310-D, with a portfolio review simulation with initial selection questions for the user to answer on the user interface (e.g., user interface 132) of the user computing device (e.g., user computing device 130). The plurality of initial selection questions are in regards to details about the portfolio review simulation including a number of slides included in a portfolio (e.g., 320-$D_1$) (if applicable), a slide (e.g., slide 320-$D_2$) on which the user wants to focus during a presentation of a portfolio, a topic (e.g., topic 320-$D_2$) on which the user wants to focus during a presentation of a portfolio, a maximum amount of time allotted to present a portfolio (e.g., 320-$D_3$) (i.e., for the system to determine a key point the user needs to make by a certain time during a presentation of a portfolio so that the user does not exceed the maximum amount of time allotted), and a type of prompt to trigger a key point to be made during a presentation of a portfolio in response to what is being shared and/or discussed at a particular point in time). In an embodiment, interview simulation program 122 enables the user to answer the plurality of initial selection questions via the user interface (e.g., user interface 132) of the user computing device (e.g., user computing device 130). It should be appreciated that FIG. 3D provides only an illustration of one implementation and does not imply any limitations with regard to the environments in which different embodiments can be implemented. Many modifications to the depicted environment can be made.

Figure 3E:
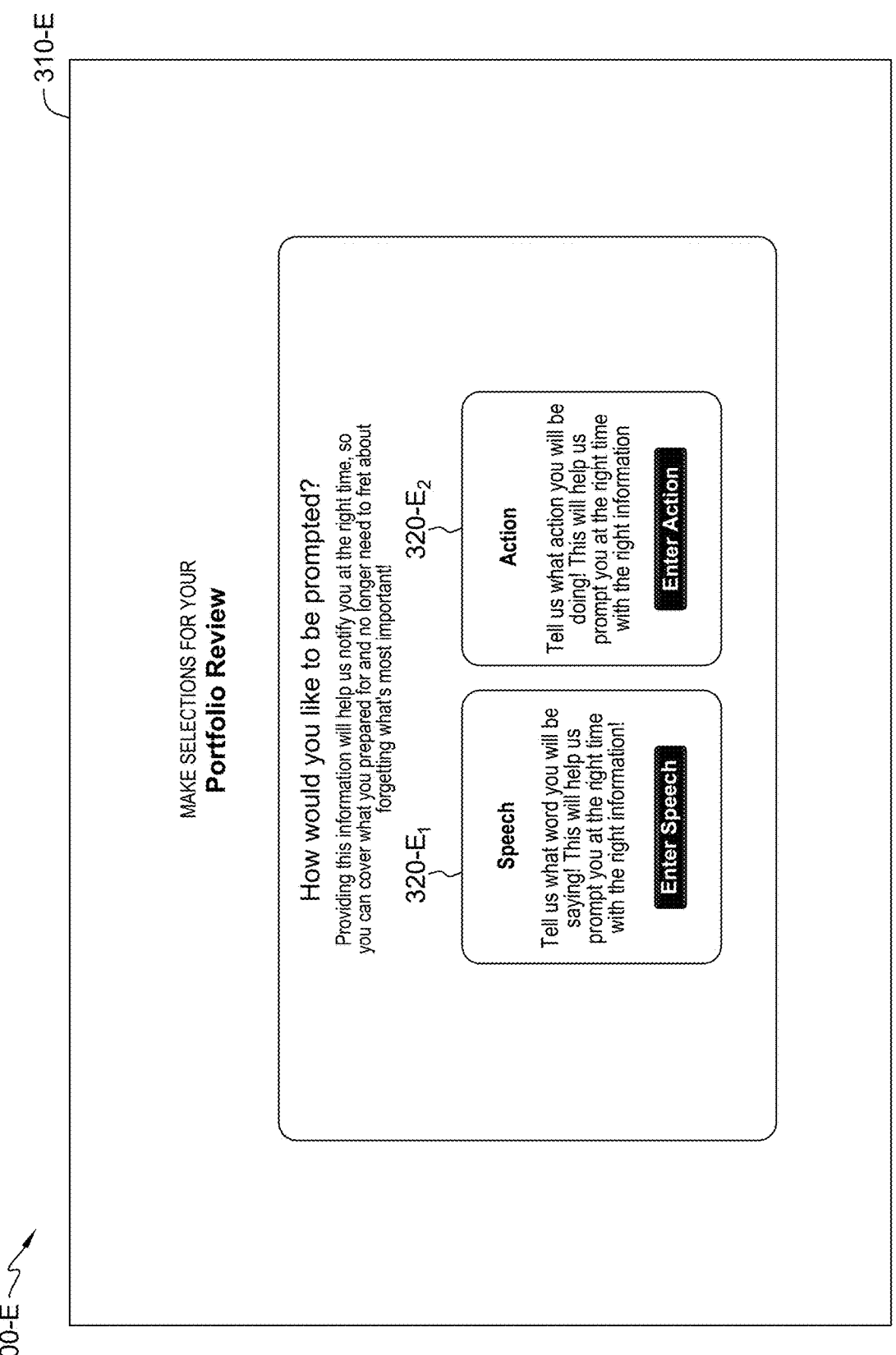
FIG. 3E depicts an example of the user interface displaying a sixth screen with a plurality of prompt type options, in accordance with an embodiment of the present invention.

FIG. 3E depicts an example, generally designated 300-E, of a user interface displaying a sixth screen with one or more prompt type options, in accordance with an embodiment of the present invention. Interview simulation program 122 presents a sixth screen, generally designated 310-E, with one or more prompt type options on the user interface (e.g., user interface 132) of the user computing device (e.g., user computing device 130). The one or more prompt type options include speech 320-E₁ and action 320-E₂. Interview simulation program 122 enables the user to select a prompt type option from the one or more prompt type options displayed via the user interface (e.g., user interface 132) of the user computing device (e.g., user computing device 130). It should be appreciated that FIG. 3E provides only an illustration of one implementation and does not imply any limitations with regard to the environments in which different embodiments can be implemented. Many modifications to the depicted environment can be made.

Figure 3F:
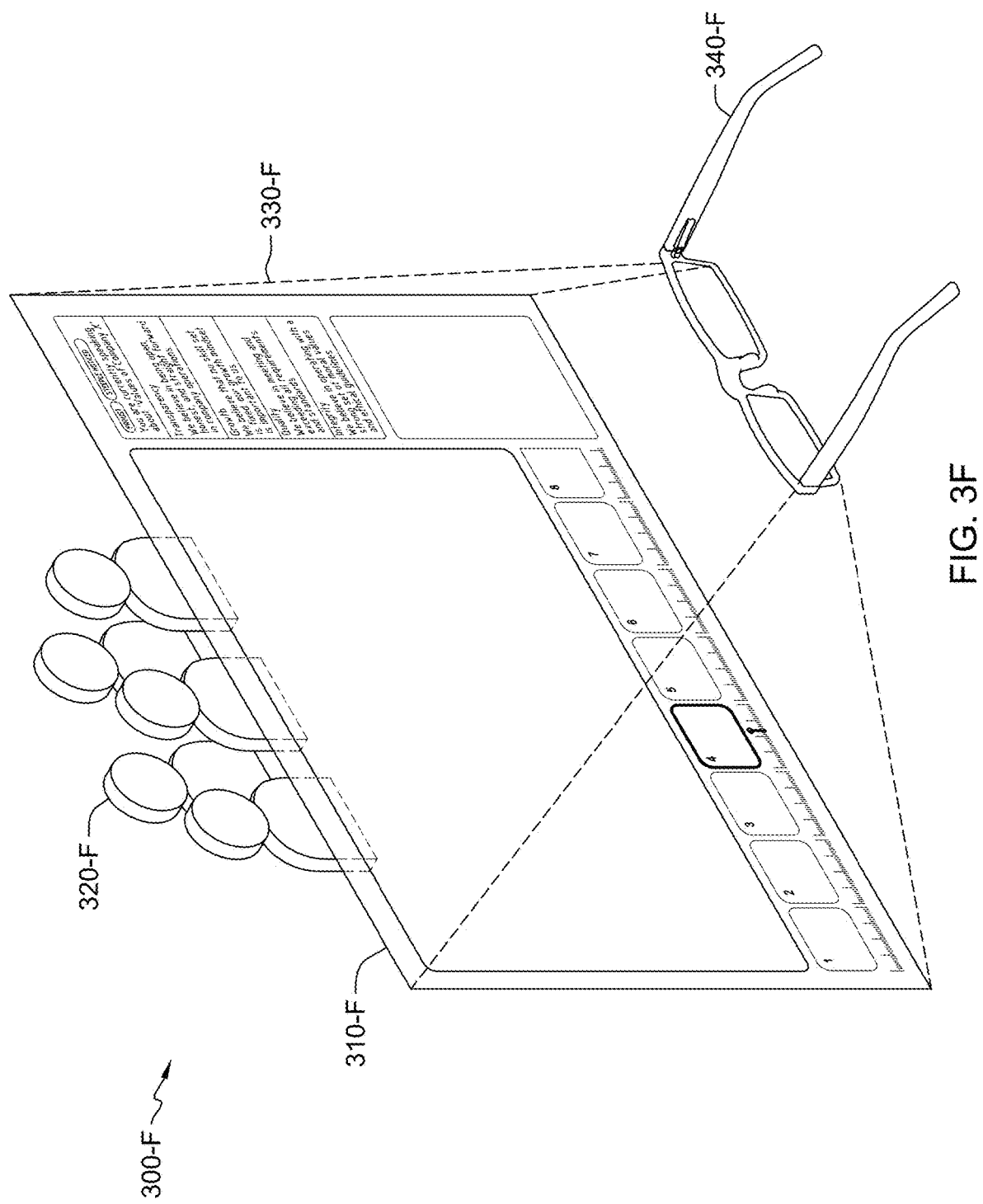
FIG. 3F depicts a diagram illustrating a use of a pair of smart glasses by a user to view one or more recommendations made during a simulation of a practice interview, in accordance with an embodiment of the present invention.

FIG. 3F depicts a diagram, generally designated 300-F, illustrating a use of a pair of smart glasses by a user to view one or more recommendations made during a simulation of a practice interview, in accordance with an embodiment of the present invention. During a panel interview (e.g., 320-F), interview simulation program 122 mirrors one or more actions made by the user, beginning when the user starts the panel interview and ending when the user ends the panel interview, on a screen, generally designated 310-F. Interview simulation program 122 outputs one or more notifications (e.g., 330-F₁₋ₙ) to the user on the user interface (e.g., user interface 132) of the user computing device (e.g., user computing device 130). The one or more notifications (e.g., 330-F₁₋ₙ) provide one or more recommendations to improve one or more behaviors of the user during the panel interview based on the set of data collected. Interview simulation program 122 enables the user to view the one or more recommendations using a pair of smart glasses (e.g., 340-F). It should be appreciated that FIG. 3F provides only an illustration of one implementation and does not imply any limitations with regard to the environments in which different embodiments can be implemented. Many modifications to the depicted environment can be made.

Figure 3G:
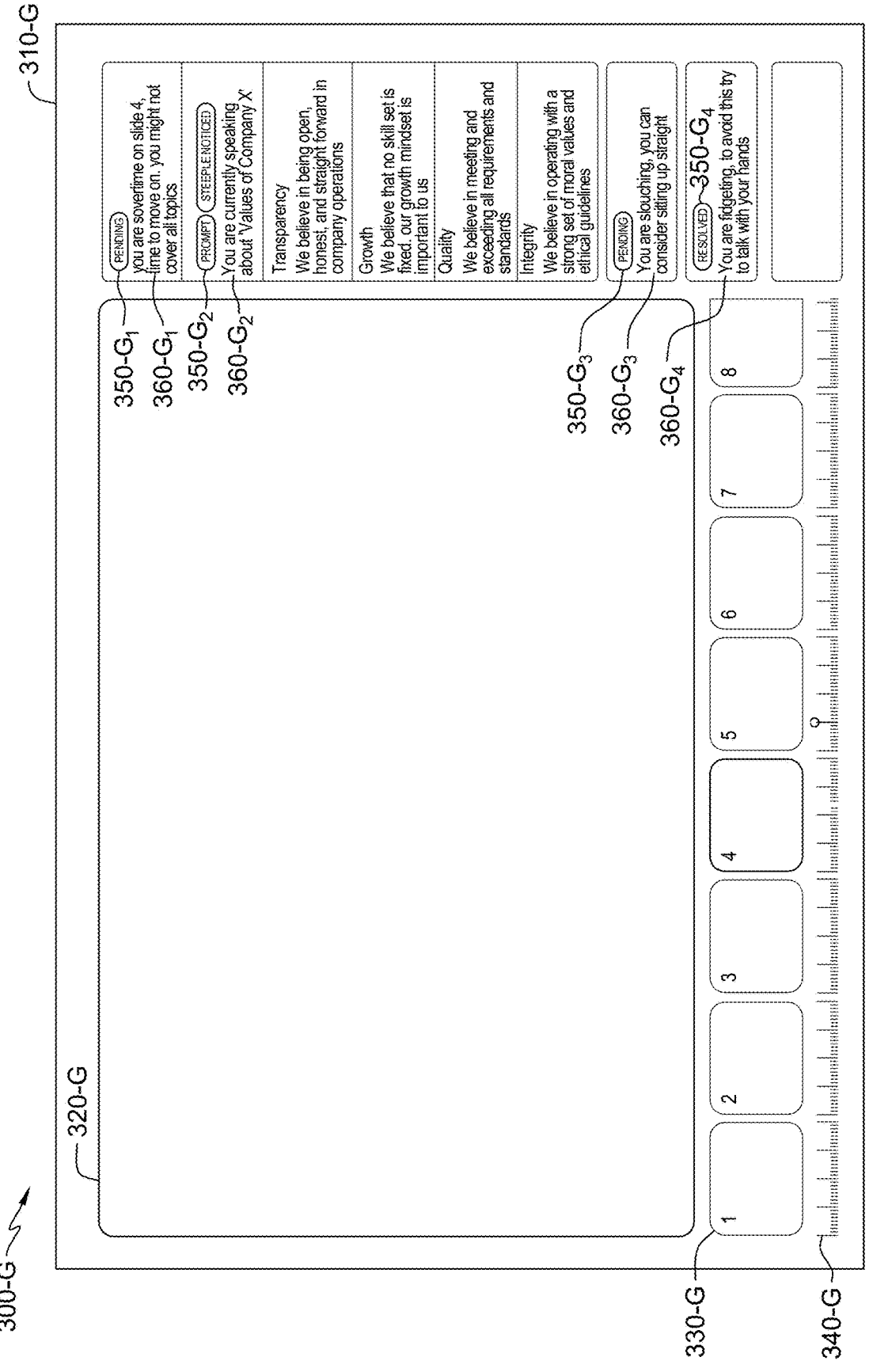
FIG. 3G depicts an example of the user interface displaying a mirroring process during the simulation of the practice interview, in accordance with an embodiment of the present invention.

FIG. 3G depicts an example, generally designated 300-G, of a user interface displaying a mirroring process during a simulation of a practice interview, in accordance with an embodiment of the present invention. Interview simulation program 122 tracks an amount of time allotted for an interview and a context of discussion. Interview simulation program 122 tracks an amount of time for an interview and a context of discussion to ensure a user makes a key point by a certain time so that the user does not exceed the maximum amount of time allotted. Interview simulation program 122 changes a color of a user interface (e.g., user interface 132) of a user computing device (e.g., user computing device 130) to coordinate with whether the user is on track (i.e., on time, e.g., green) or off track (i.e., behind or ahead of time, e.g., red). Interview simulation program 122 prompts the user with a notification (e.g., 360-G₁₋ₙ) on a user interface (e.g., user interface 132) of a user computing device (e.g., user computing device 130) if the user is off track with timing. The notification (e.g., 360-G₁₋ₙ) provided on a user interface (e.g., user interface 132) of a user computing device (e.g., user computing device 130) is a change in a color of the user interface (e.g., user interface 132) of the user computing device (e.g., user computing device 130). Interview simulation program 122 inserts a color-coded indicator (e.g., 350-G₁₋ₙ) (i.e., a pending status and a resolved status) to advise the user of a suggested change in presentation. Interview simulation program 122 displays a change in color of the user interface (e.g., user interface 132) and one or more notifications (e.g., 360-G₁₋ₙ) indicating a user is off track in regards to timing and an allotted time per slide. Interview simulation program 122 inserts a flag (e.g., 340-G) to advise the user of a suggested change in a body posture. It should be appreciated that FIG. 3G provides only an illustration of one implementation and does not imply any limitations with regard to the environments in which different embodiments can be implemented. Many modifications to the depicted environment can be made.

Figure 3H:
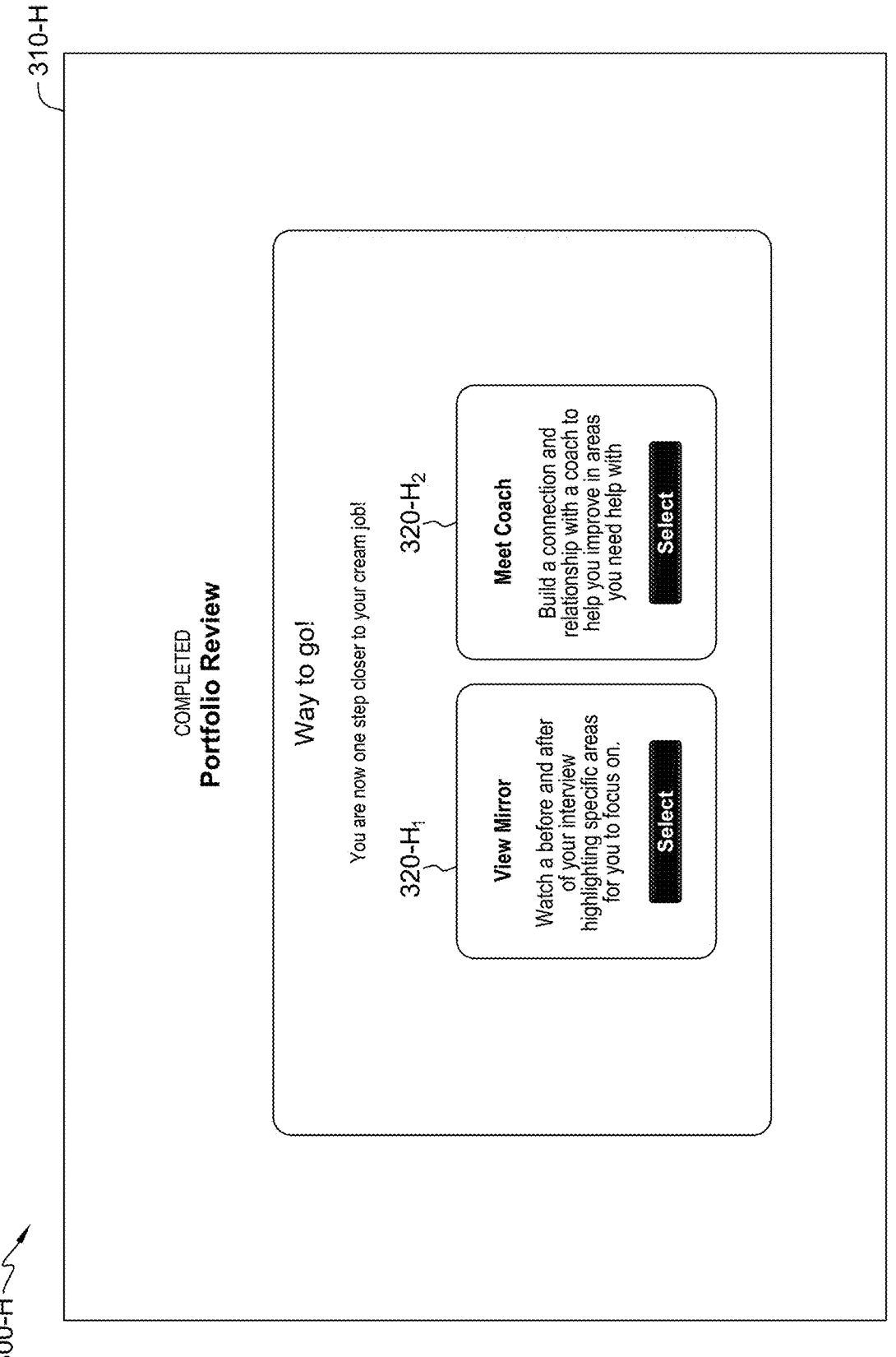
FIG. 3H depicts an example of the user interface displaying a seventh screen with the one or more action options, in accordance with an embodiment of the present invention.

FIG. 3H depicts an example, generally designated 300-H, of a user interface displaying a seventh screen with one or more action options, in accordance with an embodiment of the present invention. Interview simulation program 122 presents a seventh screen (i.e., an interview completion screen), generally designated 310-H, with the one or more action options on a user interface (e.g., user interface 132) of a user computing device (e.g., user computing device 130). The one or more action options include an action option to review a mirroring of the interview independently (e.g., 320-H₁) and an action option to meet with an interview coach to discuss the interview (e.g., 320-H₂). Interview simulation program 122 enables the user to select an action option from the one or more action options displayed via the user interface (e.g., user interface 132) of the user computing device (e.g., user computing device 130). It should be appreciated that FIG. 3H provides only an illustration of one implementation and does not imply any limitations with regard to the environments in which different embodiments can be implemented. Many modifications to the depicted environment can be made.

Figure 3I:
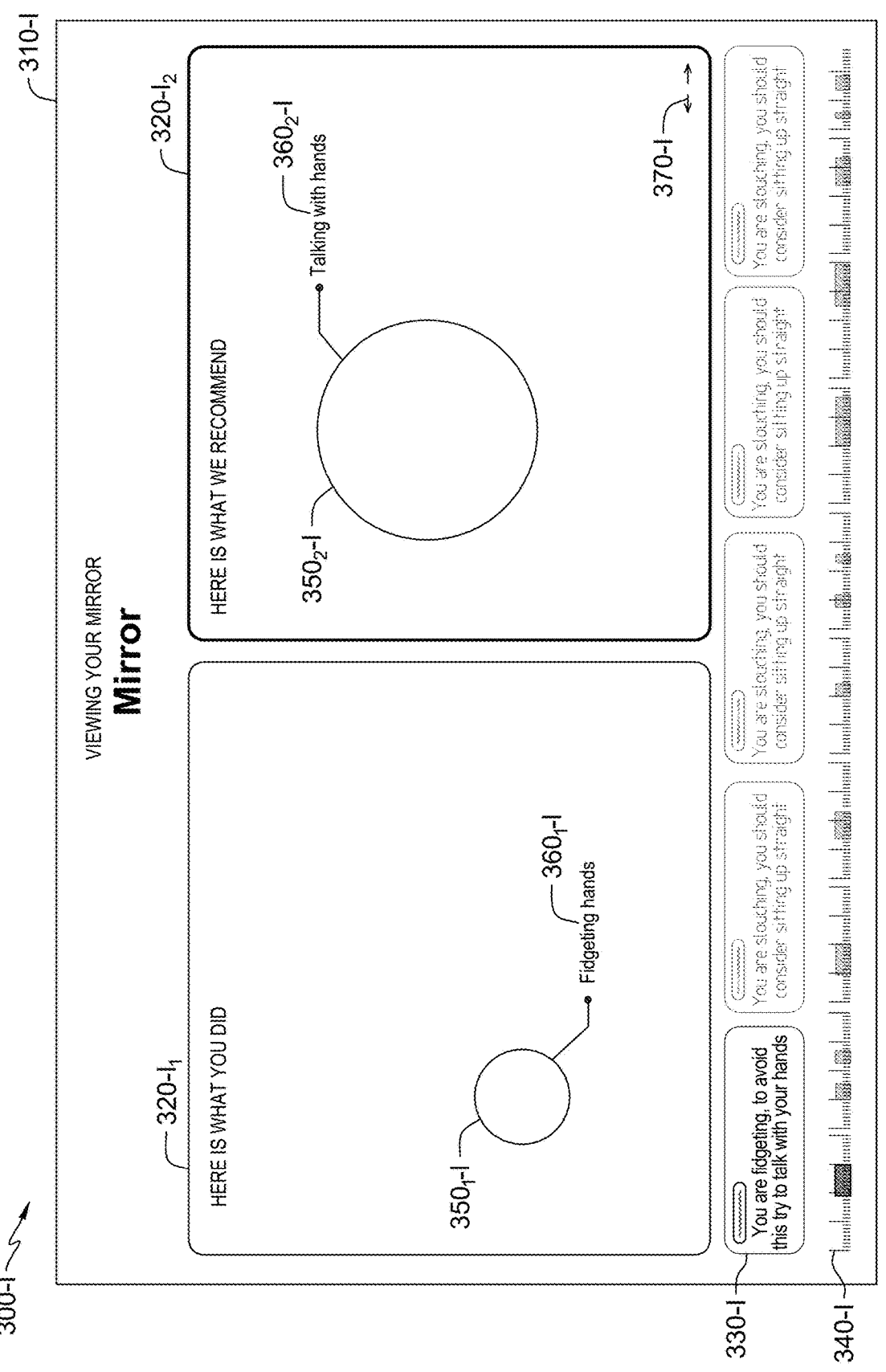
FIG. 3I depicts an example of the user interface displaying a mirroring component, in accordance with an embodiment of the present invention.

FIG. 3I depicts an example, generally designated 300-I, of a user interface displaying a mirroring component, in accordance with an embodiment of the present invention. Interview simulation program 122 enables the user to review the mirroring component (e.g., 310-I) on a user interface (e.g., user interface 132) of user computing device 130. The mirroring component includes a depiction (e.g., a picture or a video) of a user's performance (e.g., 320-I₁) and a recommendation on how to improve a user's performance (e.g., 320-I₂). The mirroring component also includes a presentation timeline (e.g., 330-I) with one or more areas of improvement noted and marked in a red color and one or more highlighted spans of time (e.g., 340-I) associated with one or more recommendations made by interview simulation program 122 to the user. Interview simulation program 122 displays a spotlight (e.g., 350₁-I) on and a description (e.g., 360₁-I) of an aspect of the user's performance. Interview simulation program 122 also displays a spotlight (e.g., 350₂-I) on and description (e.g., 360₂-I) of an aspect of recommendation on how to improve a user's performance (e.g., 320-I₂). An arrow (e.g., 370-I) is also displayed to enable the user to return to a previous recommendation or to skip to the next recommendation. It should be appreciated that FIG. 3I provides only an illustration of one implementation and does not imply any limitations with regard to the environments in which different embodiments can be implemented. Many modifications to the depicted environment can be made.

Figure 3J:
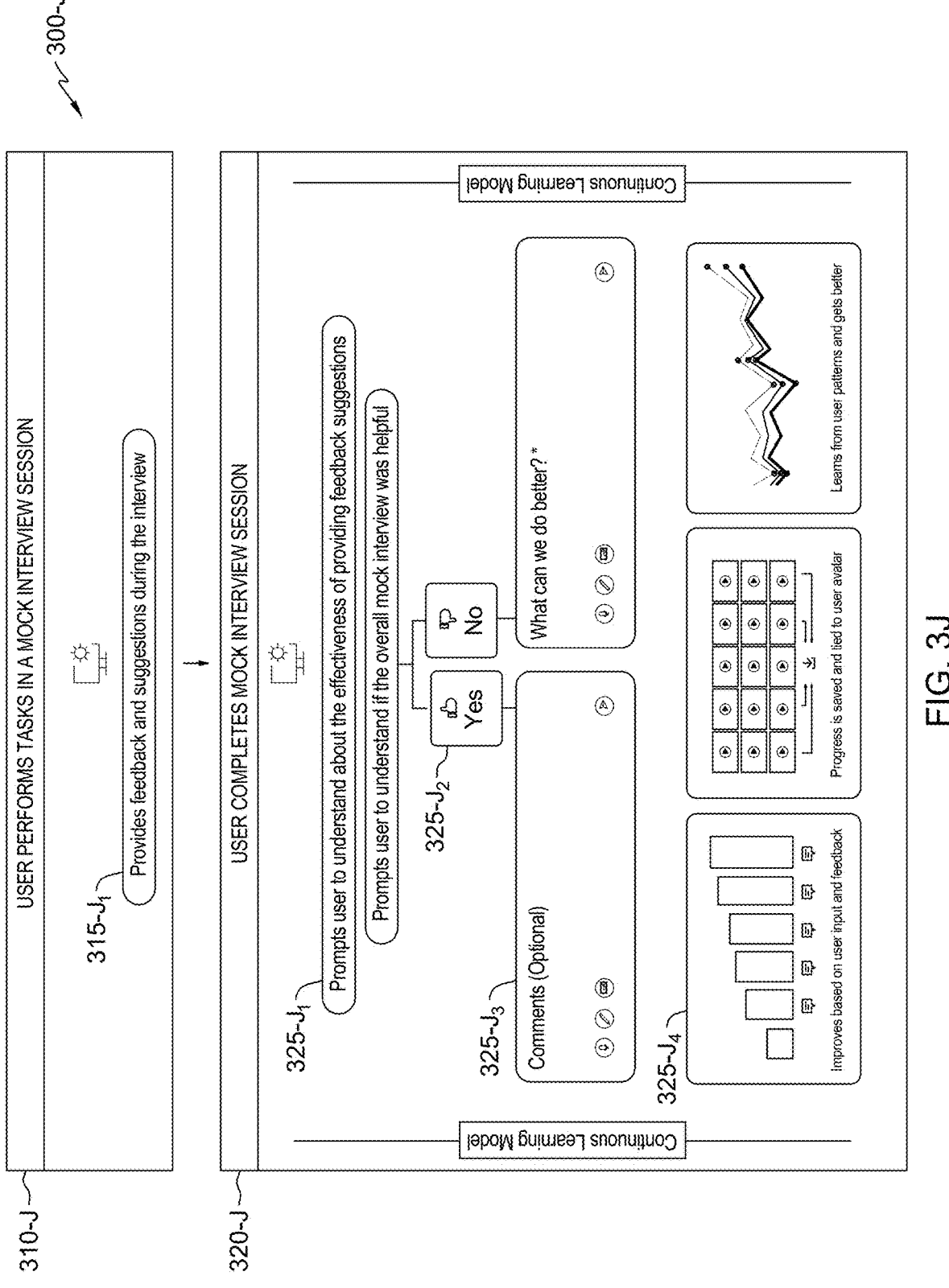
FIG. 3J depicts a diagram illustrating a continuous learning model, in accordance with an embodiment of the present invention.

FIG. 3J depicts a diagram, generally designated 300-J, illustrating a continuous learning model, in accordance with an embodiment of the present invention. Responsive to the user completing an interview (e.g., 320-J), interview simulation program 122 outputs a request for feedback to the user through a user interface (e.g., user interface 132) of a user computing device (e.g., user computing device 130). Interview simulation program 122 enables the user to input the feedback through the user interface (e.g., user interface 132) of the user computing device (e.g., user computing device 130). Feedback input (e.g., 325-J₂) by the user includes a positive reaction and a negative reaction to the interview and to the recommendations provided during the interview. The positive reaction includes, but is not limited to, an acceptance of a recommendation provided and an indication that the interview was helpful (e.g., asking the user whether the overall interview was helpful and having the user respond by selecting "Yes/Thumbs Up"). The negative reaction includes, but is not limited to, a disapproval of a recommendation provided and an indication that the interview was not helpful (e.g., asking the user whether the overall interview was helpful and having the user respond by selecting "No/Thumbs Down"). Optional comment box (e.g., $325-J_3$) appears for the user to input specific thoughts and/or feedback. The user may input specific thoughts and/or feedback by typing or by speaking. Interview simulation program 122 incorporates the feedback into a reinforcement learning model to adjust one or more factors of the interview to continually optimize the interview. It should be appreciated that FIG. 3J provides only an illustration of one implementation and does not imply any limitations with regard to the environments in which different embodiments can be implemented. Many modifications to the depicted environment can be made.

Figure 3K:
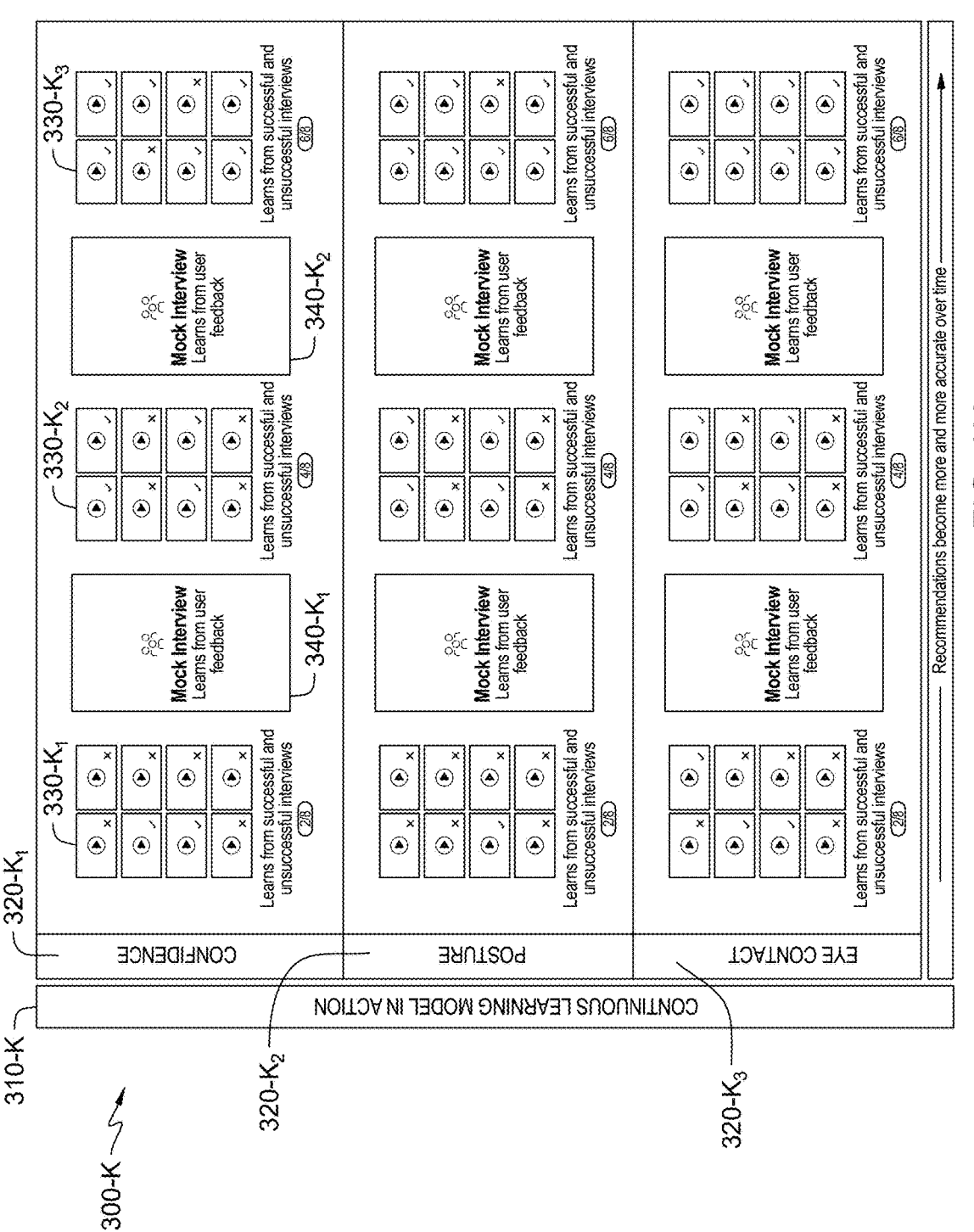
FIG. 3K depicts a diagram illustrating a rate of accuracy of the continuous learning model increasing over time, in accordance with an embodiment of the present invention.

FIG. 3K depicts a diagram, generally designated 300-K, illustrating a rate of accuracy of the continuous learning model increasing over time, in accordance with an embodiment of the present invention. It should be appreciated that FIG. 3K provides only an illustration of one implementation and does not imply any limitations with regard to the environments in which different embodiments can be implemented. Many modifications to the depicted environment can be made.

FIG. 4 is a functional block diagram illustrating a computing environment, for running interview simulation program 122, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing environment 400 contains an example of an environment for the execution of at least some of the computer code involved in performing the inventive methods, such as interview simulation program 122. In addition to interview simulation program 122, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and interview simulation program 122, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in interview simulation program 122 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in interview simulation program 122 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for providing real-time feedback while simulating an interview environment, the computer-implemented method comprising:

receiving an interview format selection from a first user interface presenting a user with a plurality of interview formats;

receiving an interview type selection from a second user interface, the user interface presenting a user with a plurality of interview types;

presenting, by an interview simulation program, a simulated interview environment to the user via an augmented reality device, the interview environment representative of the selected interview type and the selected interview format;

recording to a database a set of time stamped data including content of discussion and biometric data of the user while the user participates in a simulated interview in the interview environment;

analyzing, by the interview simulation program, the set of time stamped data for performance related factors based on the content of discussion spoken by the user and corresponding biometric data;

detecting a deficiency in a first performance related factor associated with the content of discussion and the corresponding biometric data during the simulated interview, the deficiency detected in part by comparison of the content of discussion with a presentation of a portfolio; and mirroring, via the augmented reality device, a behavior of the user when exhibiting the first performance related factor during the simulated interview, the mirroring including inserting, in real time, one or more color-coded indicators into a display of the augmented reality device to advise the user of a suggested change in the content of discussion during the simulated interview.

2. The computer-implemented method of claim 1, wherein:

the plurality of interview formats include at least one of a one-on-one interview, a panel interview, and a company specific interview, and the plurality of interview types include at least one of a behavioral review option, a technical review option, and a portfolio review option.

3. The computer-implemented method of claim 1, wherein the mirroring inserts one or more flags to advise the user of one or more suggested changes in a body posture of the user during the interview.

4. The computer-implemented method of claim 1, further comprising:

replaying the mirroring to the user; and highlighting a span of the mirroring associated with the suggested change.

5. The computer-implemented method of claim 1, further comprising:

replaying the mirroring to the user and a coach selected by the user, simultaneously;

pausing the interview at one or more spans of the mirroring associated with the suggested change; and enabling the coach to communicatively critique the interview with the user.

6. The computer-implemented method of claim 5, wherein the coach is presented for selection based on a machine learning model to identify a match between the deficiency of the user during the interview and a candidate coach proficient in the deficiency of the user.

7. The computer-implemented method of claim 1, further comprising:

outputting a notification to the user during the simulated interview, wherein the notification is an explanation of the suggested change, which is made to improve an interview skill.

8. The computer-implemented method of claim 1, wherein the one or more color-coded indicators is a change in screen color to coordinate with whether the user is on track or off track with the presentation of the portfolio.

9. A computer program product for providing real-time feedback while simulating an interview environment, the computer program product comprising:

one or more computer readable storage media and program instructions stored on the one or more computer readable storage media, the program instructions comprising:

program instructions to receive an interview format selection from a first user interface presenting a user with a plurality of interview formats;

program instructions to receive an interview type selection from a second user interface, the user interface presenting a user with a plurality of interview types;

program instructions to present a simulated interview environment to the user via an augmented reality device, the interview environment representative of the selected interview type and the selected interview format;

program instructions to record to a database a set of time stamped data including content of discussion and biometric data of the user while the user participates in a simulated interview in the interview environment;

program instructions to analyze the set of time stamped data for performance related factors based on the content discussion spoken by the user and corresponding biometric data;

program instructions to detect a deficiency in a first performance related factor associated with the content of discussion and the corresponding biometric data during the simulated interview, the deficiency detected in part by comparison of the content of discussion with a presentation of a portfolio; and program instructions to mirror, via the augmented reality device, a behavior of the user when exhibiting the first performance related factor during the simulated interview, the mirroring including inserting, in real time, one or more color-coded indicators into a display of the augmented reality device to advise the user of a suggested change in the content of discussion during the simulated interview.

10. The computer program product of claim 9, wherein the program instructions further comprise:

program instructions to replay a mirroring to the user; and program instructions to highlight a span of the mirroring associated with the suggested change.

11. The computer program product of claim 9, wherein the program instructions further comprise:

program instructions to replay the mirroring to the user and a coach selected by the user, simultaneously;

program instructions to pause the interview at one or more spans of the mirroring associated with the suggested change; and program instructions to enable the coach to communicatively critique the interview with user.

12. The computer program product of claim 9, wherein:

the plurality of interview formats include at least one of a one-on-one interview, a panel interview, and a company specific interview, and the plurality of interview types include at least one of a behavioral review option, a technical review option, and a portfolio review option.

13. The computer program product of claim 9, wherein the mirroring inserts one or more flags to advise the user of one or more suggested changes in a body posture of the user during the interview.

14. The computer program product of claim 9, wherein the program instructions further comprise:

program instructions to output a notification to the user during the simulated interview, wherein the notification is an explanation of the suggested change, which is made to improve an interview skill.

15. A computer system for providing real-time feedback while simulating an interview environment, the computer system comprising:

one or more computer processors;

one or more computer readable storage media;

program instructions collectively stored on the one or more computer readable storage media for execution by at least one of the one or more computer processors, the stored program instructions comprising:

program instructions to receive an interview format selection from a first user interface presenting a user with a plurality of interview formats;

program instructions to receive an interview type selection from a second user interface, the user interface presenting a user with a plurality of interview types;

program instructions to present a simulated interview environment to the user via an augmented reality device, the interview environment representative of the selected interview type and the selected interview format;

program instructions to record to a database a set of time stamped data including content of discussion and biometric data of the user while the user participates in a simulated interview in the interview environment;

program instructions to analyze the set of time stamped data for performance related factors based on the content discussion spoken by the user and corresponding biometric data;

program instructions to detect a deficiency in a first performance related factor associated with the content of discussion and the corresponding biometric data during the simulated interview, the deficiency detected in part by comparison of the content of discussion with a presentation of a portfolio; and program instructions to mirror, via the augmented reality device, a behavior of the user when exhibiting the first performance related factor during the simulated interview, the mirroring including inserting, in real time, one or more color-coded indicators into a display of the augmented reality device to advise the user of a suggested change in the content of discussion during the simulated interview.

16. The computer system of claim 15, wherein the program instructions further comprise:

program instructions to replay a mirroring to the user; and program instructions to highlight a span of the mirroring associated with the suggested change.

17. The computer system of claim 15, wherein the program instructions further comprise:

program instructions to replay the mirroring to the user and a coach selected by the user, simultaneously;

program instructions to pause the interview at one or more spans of the mirroring associated with the suggested change; and program instructions to enable the coach to communicatively critique the interview with user.

18. The computer system of claim 15, wherein the stored program instructions further comprise:

program instructions to output a notification to the user during the simulated interview, wherein the notification is an explanation of the suggested change, which is made to improve an interview skill.

19. The computer system of claim 15, wherein:

the plurality of interview formats include at least one of a one-on-one interview, a panel interview, and a company specific interview, and the plurality of interview types include at least one of a behavioral review option, a technical review option, and a portfolio review option.

20. The computer system of claim 15, wherein the mirroring inserts one or more flags to advise the user of one or more suggested changes in a body posture of the user during the interview.

* * * * *